(12) United States Patent
Sabau

(10) Patent No.: US 11,402,854 B2
(45) Date of Patent: Aug. 2, 2022

(54) PLATOONING CONTROL VIA ACCURATE SYNCHRONIZATION

(71) Applicant: ROAD TRAINS LLC, Hoboken, NJ (US)

(72) Inventor: Serban Sabau, Hoboken, NJ (US)

( * ) Notice: Subject to any disclaimer, the term of this patent is extended or adjusted under 35 U.S.C. 154(b) by 225 days.

(21) Appl. No.: 16/695,973

(22) Filed: Nov. 26, 2019

(65) Prior Publication Data

US 2020/0166953 A1     May 28, 2020

Related U.S. Application Data

(63) Continuation of application No. 15/494,322, filed on Apr. 21, 2017, now Pat. No. 10,488,869, which is a continuation of application No. PCT/US2015/056741, filed on Oct. 21, 2015.

(60) Provisional application No. 62/145,591, filed on Apr. 10, 2015, provisional application No. 62/075,656, filed on Nov. 5, 2014, provisional application No.
(Continued)

(51) Int. Cl.
| | |
|---|---|
| *G05D 1/02* | (2020.01) |
| *B60W 30/16* | (2020.01) |
| *G05D 1/00* | (2006.01) |
| *G08G 1/00* | (2006.01) |
| *B60K 31/00* | (2006.01) |

(52) U.S. Cl.
CPC .......... *G05D 1/0295* (2013.01); *B60W 30/16* (2013.01); *G05D 1/0027* (2013.01); *G05D 1/024* (2013.01); *G08G 1/22* (2013.01); *B60K 31/0008* (2013.01); *G05D 1/0291* (2013.01); *G05D 1/0293* (2013.01); *G05D 2201/0213* (2013.01)

(58) Field of Classification Search
None
See application file for complete search history.

(56) References Cited

U.S. PATENT DOCUMENTS 9,423,794 B2 *   8/2016   Lind ................... G05D 1/0295

OTHER PUBLICATIONS

Middleton et al., "String Instability in Classes of Linear Time Invariant Formation Control With Limited Communication Range", IEEE Transactions on Automatic Control, vol. 55, No. 7, Jul. 2010, pp. 1519-1530. (Year: 2010).*
(Continued)

*Primary Examiner* — Todd Melton
(74) *Attorney, Agent, or Firm* — Capitol Patent & Trademark Law Firm, PLLC

(57) ABSTRACT

Various embodiments provide for platooning control via accurate synchronization that will not result in string instability. Some embodiments provide a distributed control scheme for platoon motion control that provides a decentralized implementation of the leader information controller. These control techniques are able to manage the performance of the string of vehicles by maintaining a desired spacing distance between any two successive vehicles in the presence of communications induced delays. In order to regulate the spacing between a vehicle and its predecessor in the string, every vehicle (with the exception of the leader vehicle) uses the relative distance from itself to its predecessor (e.g., as measured using a laser ranging sensor) and a control signal of the predecessor (e.g., received via a wireless link). Various embodiments are capable of dealing with non-homogeneous strings of vehicles and non identical controllers for each vehicle in the string.

18 Claims, 11 Drawing Sheets

Related U.S. Application Data

62/068,319, filed on Oct. 24, 2014, provisional application No. 62/066,703, filed on Oct. 21, 2014.

(56) References Cited

OTHER PUBLICATIONS

Ploeg et al., "LP String Stability of Cascaded Systems: Application to Vehicle Platooning", IEEE Transactions on Control Systems Technology, vol. 22, No. 2, Mar. 2014, pp. 786-793. (Year: 2014).*

* cited by examiner

PLATOONING CONTROL VIA ACCURATE SYNCHRONIZATION

CROSS REFERENCE TO RELATED APPLICATIONS

This application is a continuation of U.S. application Ser. No. 15/494,322 filed Apr. 21, 2017. The Ser. No. 15/494,322 is a continuation of PCT/US2015/056741 which in turn claims priority from U.S. Provisional Patent Application No. 62/066,703 filed on Oct. 21, 2014, U.S. Provisional Patent Application No. 62/068,319 filed Oct. 24, 2014, U.S. Provisional Patent Application No. 62/075,656 filed Nov. 5, 2014 and U.S. Provisional Patent Application No. 62/145,591 filed Apr. 10, 2015, the contents of all of which are hereby incorporated by reference herein in their entireties for all purposes.

TECHNICAL FIELD

Various embodiments of the present technology generally relate to automated control of platooning vehicles. More specifically, some embodiments relate to a mechanism for platooning control via accurate synchronization.

BACKGROUND

Technological advances in various disciplines such as computer vision, ranging sensors, wireless communications and estimation and detection algorithms have made autonomous vehicles a reality. From automated flying drones to automobiles, these vehicles have the ability to make decisions and perform almost any maneuver without any human assistance. Such maneuvering can be safely performed, for example, on public roadways with traffic present and includes emergency stopping, steering and turning, navigating, lateral and garage parking. Sensor data and other information is collected and processed in order to facilitate lane keeping, traffic signs recognition and awareness, object tracking in vehicle's operating range (pedestrians or other vehicles), etc. and then used to determine accordingly the vehicle's desired trajectory.

However, there are still many operations of autonomous vehicles which are difficult to perform in an automated fashion. For example, platoon motion control has been a problem of interest for the control engineering community for about fifty years and still persists. The platoon motion control problem is easy to solve (using standard design methods) provided that each vehicle in the platoon has instant access at all times at the relative coordinates and at the instantaneous speed of all other vehicles. Even with today's ubiquitous communication technology this is not a realistic scenario.

As a result, the control engineering community has considered of interest those decentralized control schemes which use information that can be measured with sensors placed on-board each vehicle, specifically the relative distance from each vehicle to its predecessor in the platoon. This is typically a distance ranging between 20 and 250 yards, which can be measured using a low cost but highly reliable optic (lidar) or radar (electromagnetic) ranging sensor mounted on each vehicle. However, a difficulty dubbed "string instability" has been documented for control schemes with long strings of vehicles that use only local information.

Intuitively "string instability" can be described as the phenomenon of amplification of a disturbance to the leader vehicle, as the disturbance propagates toward the back of the platoon. "String instability" is obviously undesirable, since it can ultimately lead to vehicles in the string crashing into each other. Equally important, lack of a strong attenuation of a disturbance to any car in the string propagating towards the back the string (i.e., a high "sensitivity to disturbances"), even if it does not necessarily lead to instability, it produces another highly unwanted effect: the so-called accordion effect. The accordion effect greatly disrupts the throughput of the highway traffic.

As such, there are a number of challenges and inefficiencies created in traditional automated platooning vehicle design which need to be addressed. Given the technological platforms described above that are already available to the automobile industry, it would be useful to design and implement a feasible control scheme along with suitable control algorithms, in order to tackle the undesired and potentially risky oscillatory phenomena inherent to the dynamics of vehicle platooning (the so-called Forrester effect, or bullwhip effect) while maximizing the throughput of highway traffic by reducing the accordion effect on the behavior of the platoon. It is with respect to these and other problems that embodiments of the present invention have been made.

SUMMARY

Various embodiments of the present technology generally relate to automated control of platooning vehicles (e.g., automobiles, trains, submersible vessels, drones, and other types of mobile agents). More specifically, some embodiments relate to a mechanism for platooning control via accurate synchronization.

In some embodiments, a method for operating a vehicle within a string of platooning vehicles includes receiving, via a wireless communications link (e.g., an optical link or a personal area network), a control signal of a predecessor vehicle. The platoon may be heterogeneous (i.e., have at least two different vehicle types) or homogenous (i.e., all similar vehicle types). The predecessor vehicle immediately precedes the vehicle in the string of platooning vehicles.

Each vehicle in the string of platooning vehicles may have access to a synchronized clock. The control signal from the predecessor vehicle may have been stamped with a first time base from the synchronized clock (e.g., from a global positioning system). The method can also include determining a distance (e.g., using lidar or radar) between the vehicle and the predecessor vehicle which can be stamped or associated with a second time base from the synchronized clock. The distance and control signal can then be synchronized based on first time stamp and the second time stamp.

A control action to maintain a desired distance between the vehicle and the predecessor vehicle can be generated based at least in part on the synchronized distance and control signal. The desired distance may be constant or vary based on a variety of factors such as the current weather or road conditions. In some embodiments, the desired distance between the vehicle and the predecessor vehicle is proportional to a speed of the vehicle.

In some embodiments, a vehicle may include a throttling and braking system, a communications system, a distance measuring system, a synchronization module, and/or a controller. The throttling and braking system may be capable of accelerating or decelerating the vehicle. The communications system may include a receiver to receive communications from a predecessor vehicle and a transmitter to transmit signals to a follower vehicle. The communications system may use a variety of technologies such as, but not limited to personal area network technology, cellular technology, or optical technology for transmitting signals. The communications from the predecessor vehicle may include control signals and/or other information (e.g., vehicle identifiers, vehicle type, acceleration, and the like) from the predecessor vehicle. The controls signals and/or other information may be labeled with time stamps indicating the time of execution and/or transmission.

The distance measuring system may repeatedly measure distances between the vehicle and the predecessor vehicle over time. In some embodiments, the distance measuring system may include lidar, radar, and/or other systems capable of measuring distance. The distances measured by the distance measuring system may be stored (e.g., within a local memory) with time stamps indicating the time of measurement. The synchronization module can synchronize the distances measured by the distance measuring system and the control signals and/or other information based using the time stamps. The controller can generate a control action to be implemented by the throttling and braking system to maintain a desired distance behind the predecessor vehicle. The desired distance may be constant or dynamic (e.g., proportional to a speed of the vehicle). The control action may be based, at least in part, on the control signals and distances synchronized by the synchronization module.

The vehicle may also include a global positioning system and/or a memory having stored thereon model dynamics for one or more vehicles. In some embodiments, the controller may retrieve, from the memory, a dynamical model of the predecessor vehicle, use the dynamical model in the generation of the control action. Instead of having locally stored dynamical models, some embodiments may retrieve the model dynamics from remote storage (e.g., using a wireless network to access a cloud-based server.)

Embodiments of the present invention may also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
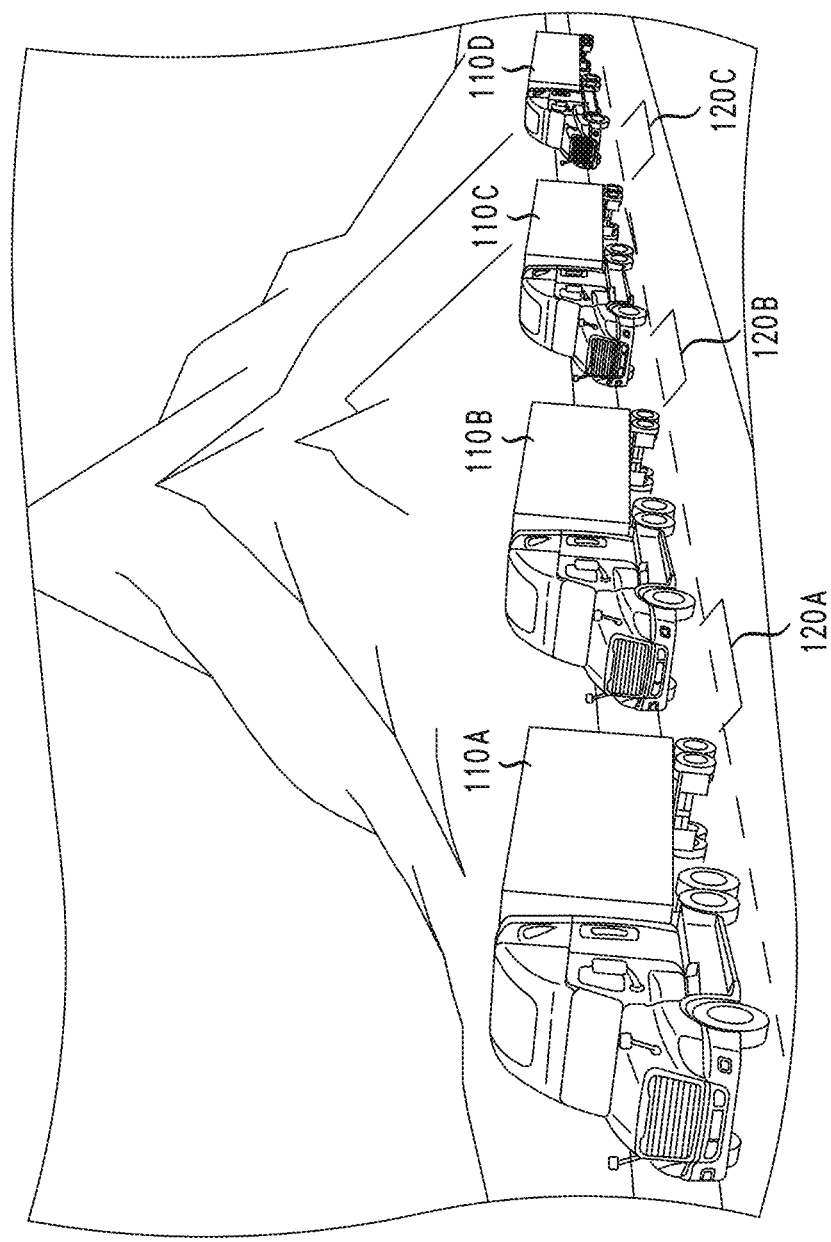
FIG. 1 illustrates a group of platooning vehicles in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to automated control of platooning vehicles (e.g., drones, trains, submersible vessels, mobile agents, and the like). More specifically, some embodiments relate to a mechanism for platooning control via accurate synchronization. Formation control for platooning of autonomous vehicles has been a longstanding problem in control theory. The automated control system's objective in the platooning problem is to regulate the inter-vehicle spacing distances (e.g., to pre-specified values) in the presence of disturbances caused by the real life road and traffic conditions. The problem could be completely solved within the classical control framework, under the assumption that each vehicle has access, in real time, to an accurate measurement of its relative positions with respect to all its predecessors in the string (centralized control). It became clear from the very beginning that this scenario is infeasible from several engineering practice standpoints.

Traditional predecessor follower control strategies where each vehicle has access to only local measurements of instantaneous distance with respect to the vehicle in front of the current vehicle (e.g., measured using onboard sensors) have a number of problems that can arise. For example, although (under the common assumption of linear dynamics for each vehicle) the internal stability of the aggregated platoon can be achieved, this basic architecture was proved to exhibit a severe drawback known as "string instability". While several formal definitions of string instability exist, they essentially describe the phenomenon of amplification downstream the platoon of the response to a disturbance at a single vehicle. Correspondingly, the configurations designated as "string stable" are those feedback configurations for which the Ha, norm of the transfer function from the disturbances at any given vehicle to any point in the aggregated closed-loop of the platoon, does not formally depend on the number of vehicles in the string.

If the vehicles dynamics contain a double integrator, then for predecessor follower schemes of homogeneous platoons with identical sub-controllers, string instability will occur irrespective of the chosen linear control law, as it is an effect of fundamental limitations of the feedback-loop. This shortcoming cannot be overcome by adding the relative distances with respect to multiple preceding vehicles to the measurements available to each sub-controller (multiple look-ahead schemes), nor can it be overcome by including the successor's relative position (bi-directional control), without exacerbating the so-called accordion effect (or settling time). Other solutions, including optimal control approaches and the sharing of additional information (e.g., acceleration), fail to resolve this issue.

In contrast, various embodiments of the present technology provide a mechanism for platooning control via accurate synchronization that will not result in the string instability of traditional approaches. For example, some embodiments provide control techniques for effectively controlling an array of n autonomous, self-driving vehicles moving in one dimension, all traveling in the same (positive) direction of a highway with a single line of traffic. These control techniques are able to manage the performance of the string of vehicles by maintaining a pre-specified spacing distance between any two successive vehicles, whilst maintaining the velocity imposed by the leader vehicle (first car in the string).

Some embodiments of the present technology, in order to regulate the spacing between itself and its predecessor in the string, every vehicle (with the exception of the leader vehicle) uses two pieces of information from its predecessor. Firstly, the relative distance from itself to its predecessor, which can be measured using an on-board laser ranging sensor and secondly, a low data rate, digital radio signal sent from its predecessor. The wireless signal may include the predecessor's control signal if the current vehicle knows, or is able to identify, the dynamical model of the predecessor vehicle. Various embodiments are capable of dealing with non-homogeneous strings of vehicles and with the case of having non identical controllers for each vehicle in the string.

As described in more detail below, some embodiments use the Youla parameterization of all leader information controllers associated with a given platoon of vehicles, by imposing a particular sparsity constraint on the Youla parameter. This parameterization can be based on a doubly coprime factorization of the aggregated model of the platoon that features a special structure. The sparsity constraint imposed on the Youla parameter preserves the structure of the doubly coprime factorizations and consequently the structure of the resulted stabilizing controllers. The tuning of the local controllers can be done by choosing $H^2$ or a $H^\infty$ (or mixed) cost functionals, represents the usual metrics in control theory to evaluate reliability and performance. The Youla parameterization of various embodiments can be amenable to incorporating such costs in the controller design method.

In some embodiments, the control signal of the predecessor vehicle can be broadcast to the subsequent (or follower) vehicle instead of a local estimate of the leader's state. The control signal is basically generated on board of the predecessor vehicle, hence there is no need to estimate it. The fact that information free of noise is broadcasted (with some time-delay induced by the wireless communication systems) has profound implications in terms of the performance of the closed loop. In some embodiments, the acceleration of the predecessor vehicle can be broadcast to the subsequent (or follower) vehicle. This can be a useful alternative, for example, when the dynamical model of the predecessor vehicle is unknown. In addition to existing Cooperative Adaptive Cruise Control Methods, the leader information control scheme introduced here can be adapted as to compensate for the feedforward time-delay induced by the wireless transmission of the predecessor's control signal, as will be explained in more detail below. The synchronization of the onboard measurements with the wirelessly received data may induce fixed, commensurate and point-wise time delays in the control mechanism thus avoiding the difficulties caused by time-varying or stochastic or distributed time delays.

Various embodiments of the present technology describe a distributed control architecture for platooning control of (semi)autonomous vehicles. The distributed implementation used in some embodiments allows for the controller on board each vehicle to use only locally available information. Some embodiments improve on existing methods in the following aspects:
- guarantees string stability in the presence of time delays induced by the wireless communications;
- eliminates the accordion effect from the behavior of the platoon;
- achieves string stability, even for constant or distance headways inter-spacing policies;
- the synchronization of the onboard measurements with the wirelessly received data induces fixed, commensurate and point-wise time delays in the control mechanism thus avoiding the difficulties caused by time-varying or stochastic or distributed time delays;
- is amenable to optimal controller design via norm based costs, while accommodating heterogeneous strings of vehicles and heterogeneous controllers.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to platooning of autonomous cars by generating a unique control scheme via synchronization, embodiments of the present technology are equally applicable to various other types of vehicles (e.g., drones, trains, submersible vessels, mobile agents and the like) as well as other applications where interspacing distance needs to controlled (e.g., in manufacturing applications).

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates a group of platooning vehicles 110A-110D in accordance with some embodiments of the present technology. While FIG. 1 only shows four vehicles, vehicles 110A-110D may be part of a larger platoon with more vehicles than illustrated in FIG. 1. Vehicle 110A is the lead vehicle which is in front of all of the subsequent (or follower) vehicles 110B-110D drafting one behind the other. A controller can be used to maintain the desired interspacing distances 120A-120C. These distances may be fixed or may change depending on various conditions (e.g., weather conditions, communication quality, weight of the vehicle, vehicle dynamics, braking abilities, and the like). For example, interspacing distances 120A-120C may increase when the roads are wet or snowy.

Figure 2:
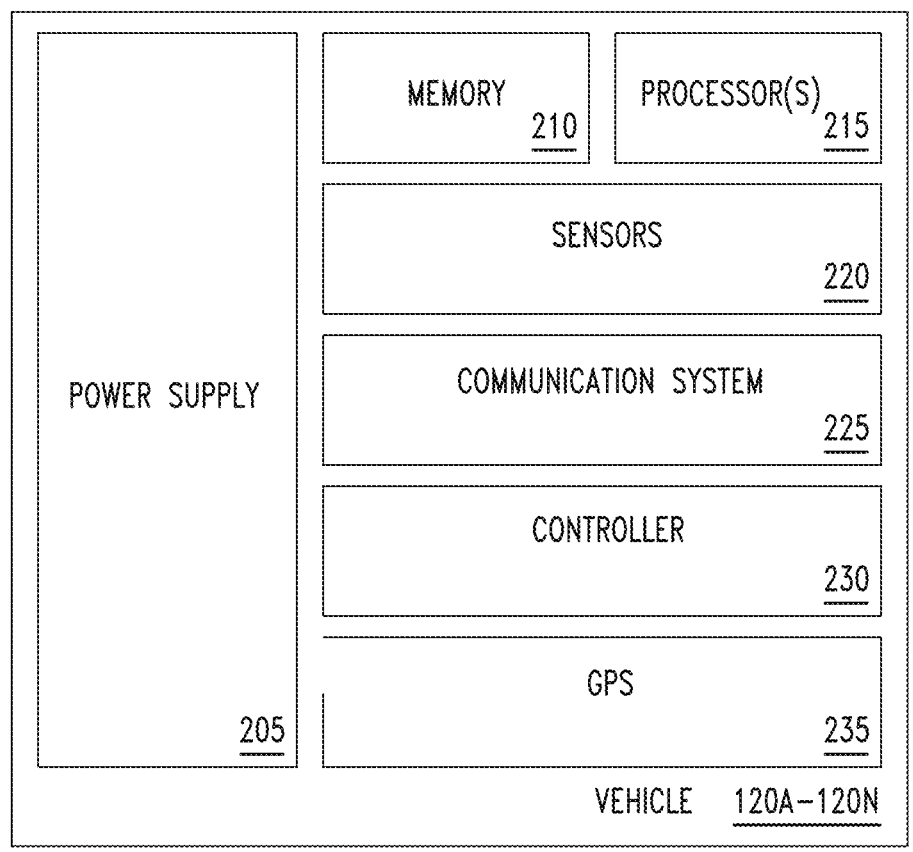
FIG. 2 illustrates an example of a set of components which may be present in a vehicle utilizing one or more embodiments of the present technology.

FIG. 2 illustrates an example of a set of components which may be present in vehicle 110A-110D in one or more embodiments of the present technology. As shown in FIG. 2 vehicle 110A-110D may include power supply 205 (e.g., battery), memory 210 (e.g., volatile memory and/or nonvolatile memory), processor(s) 215 for executing instructions and performing calculations, sensors 220, communication system 225, controller 230, and global positioning system (GPS) 235. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 210 can be any device, mechanism, or populated data structure used for storing information. In accordance with some embodiments of the present technology, memory 210 can encompass any type of, but is not limited to, volatile memory, nonvolatile memory and dynamic memory. For example, memory 210 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 215. For example, memory 210 could be used in one or more embodiments to house all or some of the instructions needed to execute the functionality of or manage sensors 220, communication system 225, controller 230, and/or GPS 235. Processor(s) 215 are the main processors of vehicle 110A-110D which may include application processors, various coprocessors, and other-dedicated processors for operating vehicle 110A-110D. Processor(s) 215 may be communicably coupled with memory 210 and configured to run the operating system, user interfaces, sensors 220, communication system 225, controller 230, GPS 235, and/or other components.

In some embodiments, processor(s) 215 may include multiple dedicated or shared processors configured to perform signal processing, implement/manage real-time radio transmission operations, or make navigation decisions (e.g., compute trajectories, implement obstacle avoidance routines, etc.). These processors along with the other components may be powered by power supply 205. The volatile and nonvolatile memories found in various embodiments may include storage media for storing information such as processor-readable instructions, data structures, program modules, models, or other data. Some examples of information that may be stored include basic input/output systems (BIOS), operating systems, and applications.

Sensors 220 may be used to detect events or changes in the surrounding environment and produce a corresponding signal that can be acted upon by various components within the vehicle or transmitted to other vehicles within the platoon or global monitoring infrastructure. In some embodiments, sensors 220 may include one or more of the following: accelerometers, camera, infrared sensors, ranging sensors, motion sensors, LIDAR, RADAR, gyroscopes, and the like. For example, a ranging sensor can be used to measure the distance to the predecessor vehicle. In some embodiments, optical ranging devices such as Hilti PD-40/PD-42 or the Leica Disto Series (D2, D5, D8) could be used. The optical ranging devices may be associated with optical target plates mounted on the back of each vehicle in order to improve ranging performance. The optical ranging devices may include an aiming system using, e.g. gyroscopic systems, computer vision or other technologies. In some embodiments, a radar ranging device (electromagnetic waves) may be used. Alternatively, sonar or other acoustic ranging devices may be used in some embodiments as they may be more applicable for certain environments (e.g. underwater vehicles).

Communication system 225 may include a local wireless communication link with neighboring vehicles, along with (GPS Synchronized) Precision Time Protocol supported by GPS 235. In accordance with various embodiments, the communication system may use a digital radio, such as Wifi, Bluetooth or ZigBee could be used, with or without enhancing the standard transmission power PTP/IEEE-1588. Other embodiments may use analog radio options enabling, for example, software radio implementations. Optical or acoustic (e.g. sonar) communication links may be preferable for underwater vehicles. Controller 230 can take various inputs and produce a control signal to regulate the interspacing distance.

While not illustrated in FIG. 2, each vehicle may include an electrohydraulic braking and throttle actuation system with calibrated control signal. For example, in some embodiments, the electrohydraulic braking systems may include a BRAKEMATIC produced by EMG Automation GmbH. In addition, various embodiments may have throttle control systems used in common cruise control systems may be used. An interface to electronic braking systems, such as those produced by TRW Automotive or the MOVE gateway produced by TNO can be used in some embodiments.

An onboard computer may be used in some embodiments. For example, a Field Programmable Gate Array (FPGS) such as the Xilinx Zynq-7000 All Programmable System on a Chip may be used in some embodiments. Alternatively, various schemes for embedded processing can be used, such as ABBs System 800xA or the AC 800M processor module 3. A dSpace Autobox system can be used in one or more embodiments. For testing purposes, alternatively, the system can be enabled using even standard computing technologies, such as a laptop or other personal computer, that has the needed data interfaces (acquisition and transmission) and a software platform such as MATLAB.

Figure 3:
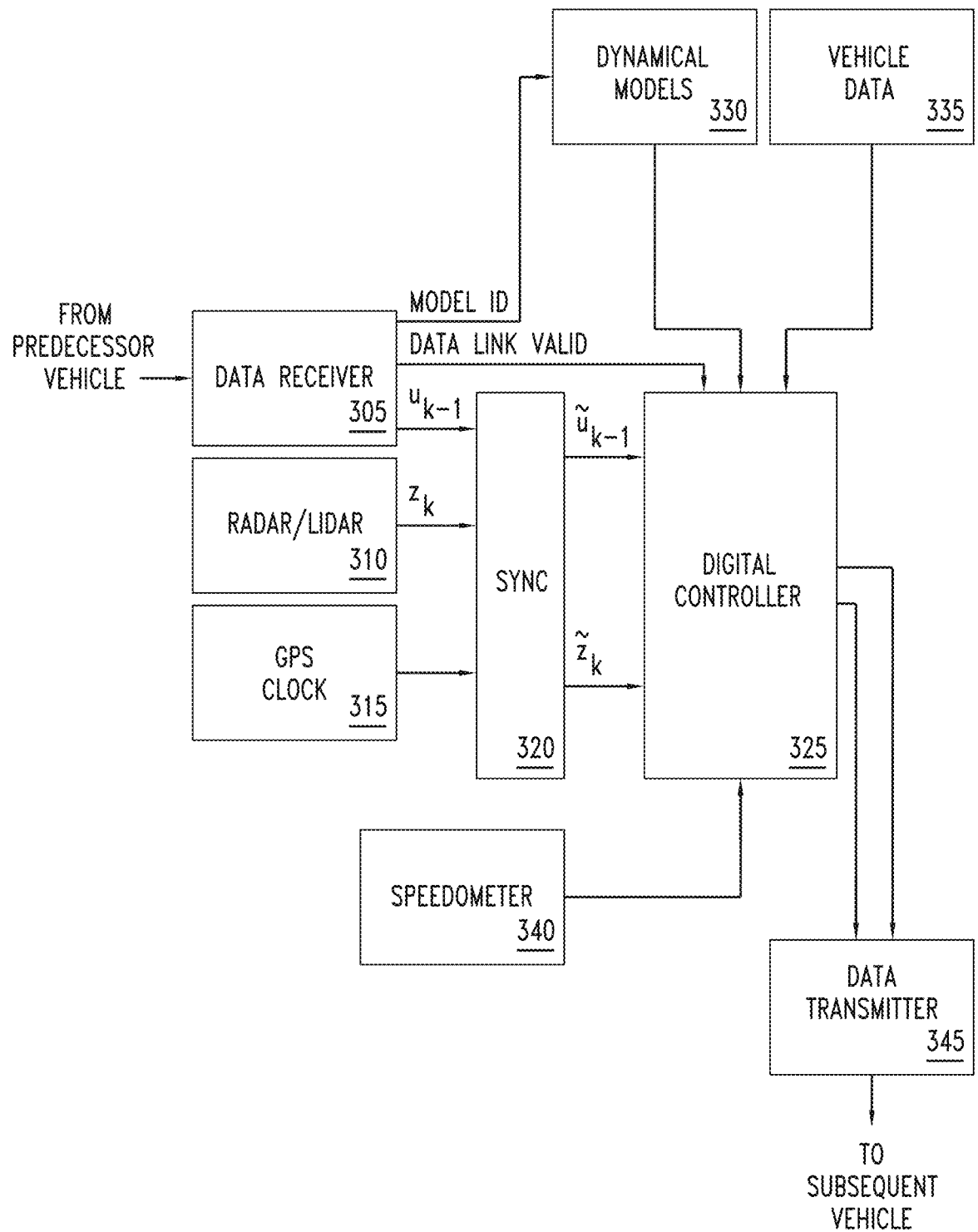
FIG. 3 illustrates an example of a set of components in a synchronization based control mechanism according to various embodiments of the present technology.

FIG. 3 illustrates an example of a set of components in a synchronization based control mechanism according to various embodiments of the present technology. As illustrated in FIG. 3, the set of components can include data receiver 305, radar/lidar system 310, GPS 315, synchronization module 320, digital controller 325, dynamical models 330, vehicular data 335, speedometer 340 and data transmitter 345. Other embodiments may include only some of these components or may include additional component not illustrated in FIG. 3.

While not performing merging/exiting maneuvering and while functioning in the semi-autonomous mode, the vehicle must maintain a wireless data link in order to receive real-time data from its predecessor in the string. In some embodiments, the received data may include: the numerical code identifying the dynamical model of the predecessor; and the nominal value of the time delay incurred at the predecessor's transmission of data; the control signal $u_{k-1}$ produced on board of the predecessor. The wireless data link can be implemented using digital radio communications such as WiFi, Zigbee, Bluetooth or other personal area network protocols. These types of personal area networks may have a limited range (e.g., less than 100 meters). The predecessor vehicle may use its own GPS timebase clock (with a very high clock update rate) for transmitting its control signal, using a time stamping protocol or something similar or equivalent.

In some embodiments, the current vehicle can also maintain a wireless data transmitter link 345 for sending to the follower in the convoy data comprising of: the numerical code identifying its own dynamical model; the nominal value of the time delay incurred at the wireless transmission of data; and the control signal $u_k$ produced by its onboard controller.

The control mechanism illustrated in FIG. 3 can use: data acquired using its onboard radar/lidar sensor 310 for measuring the interspacing distance/relative speed $z_k$ with respect to its predecessor in the string; data received wirelessly via data receiver 305 from its predecessor in the string. The onboard measurement signal $z_k$ is time stamped using the onboard GPS timebase. The predecessor's control signal $u_{k-1}$ is received on board the vehicle with a communications induced delay. Synchronization module 320 on board the vehicle can accurately identify this delay using the vehicle's local GPS timebase set by GPS clock 315 and the time stamping protocol used at the transmission of $u_{k-1}$.

Synchronization module 320 uses the identified value of the communications delay in order to synchronize the predecessor's control signal $u_{k-1}$ with the on board measurement $z_k$. Specifically, each sample of the on board measured signal $z_k$ can be delayed with the identified transmission delay of the sample of $u_{k-1}$ produced at the same time moment. The two synchronized signals $\tilde{u}_{k-1}$ and $\tilde{z}_k$ represent input signals for digital controller 325. The numerical code identifying the predecessor's dynamical model 330 can be used in conjunction with an onboard RAM device containing a data base with existing dynamical models in use by other vehicles equipped with the current technology.

In certain embodiments dealing with heterogeneous string of vehicles, the synchronization mechanism described here can be used to introduce certain supplemental time delays in the control scheme. The specific values of such supplemental time delays for each vehicle may be chosen as a function of the vehicle's latency, where the vehicle's latency is defined here to be the sum of the nominal (or worst case scenario) value of the time delay of the vehicle's electro-hydraulic brake and throttle actuating system with the nominal (or worst case scenario) value of the time delay incurred at the wireless transmission of data. The specific value of such a supplemental delay may be negotiated between the vehicles in formation (through communications protocols) and may be chosen to be equal to the maximum of the latencies of all vehicles in the string.

The predecessor's dynamical model 330 can be used as a functioning parameter for onboard digital controller 325. Information about the vehicle's operating mass is used as to set up the vehicle's dynamical model (and the corresponding numerical code identifying it) and as a functioning parameter of digital controller 325. A data validity link signal may be used as a functioning parameter of digital controller 325, confirming that the receiving of data from the predecessor is not disrupted. Any disruption in the receiving of data from the predecessor is signaled to digital controller 325 such that it can apply the brakes and reduce speed or switch to a control policy based exclusively on the onboard measurements $z_k$. A performant speedometer 340 on board the vehicle can provide the instantaneous speed of the vehicle as a functioning parameter for digital controller 340 in order to implement time-headways interspacing policies, which represent standard requirements for autonomous road vehicles.

Digital controller 340 in some embodiments can include a real-time computer platform that executes the synchronization based control mechanism's functionality, in order to produce the command signal representing the inputs of an electro-hydraulic brake and throttle actuating system (not shown). Throttle and brake valve position sensors may be used. The electro-hydraulic brake and throttle actuating system can be used in conjunction with existing mechanisms for electronic throttle control and electro-hydraulic brake valves and with existing automotive drive trains and can also serve the purpose of acquiring the desired dynamical model for the longitudinal dynamics of the vehicle. An additional interface such as MOVE gateway produced by TNO can be used in some embodiments to convert the acceleration setpoints $u_k$ into vehicle electro-hydraulic break and throttle actuating setpoints.

The dynamical model of the vehicle can be determined using existing model identification and model validation techniques by measuring the acceleration response of the vehicle to certain test signals. The operating mass (depending on the load) of the vehicle represents a parameter for its dynamical model. For each dynamical model, a unique numerical identifying code is assigned. A memory device storing the database comprising of all dynamical models along with their corresponding numerical identifiers for all vehicles using this technology is available onboard of each vehicle. More specific details of various embodiments of controllers that can be used in the platooning vehicles are described below.

Figure 4:
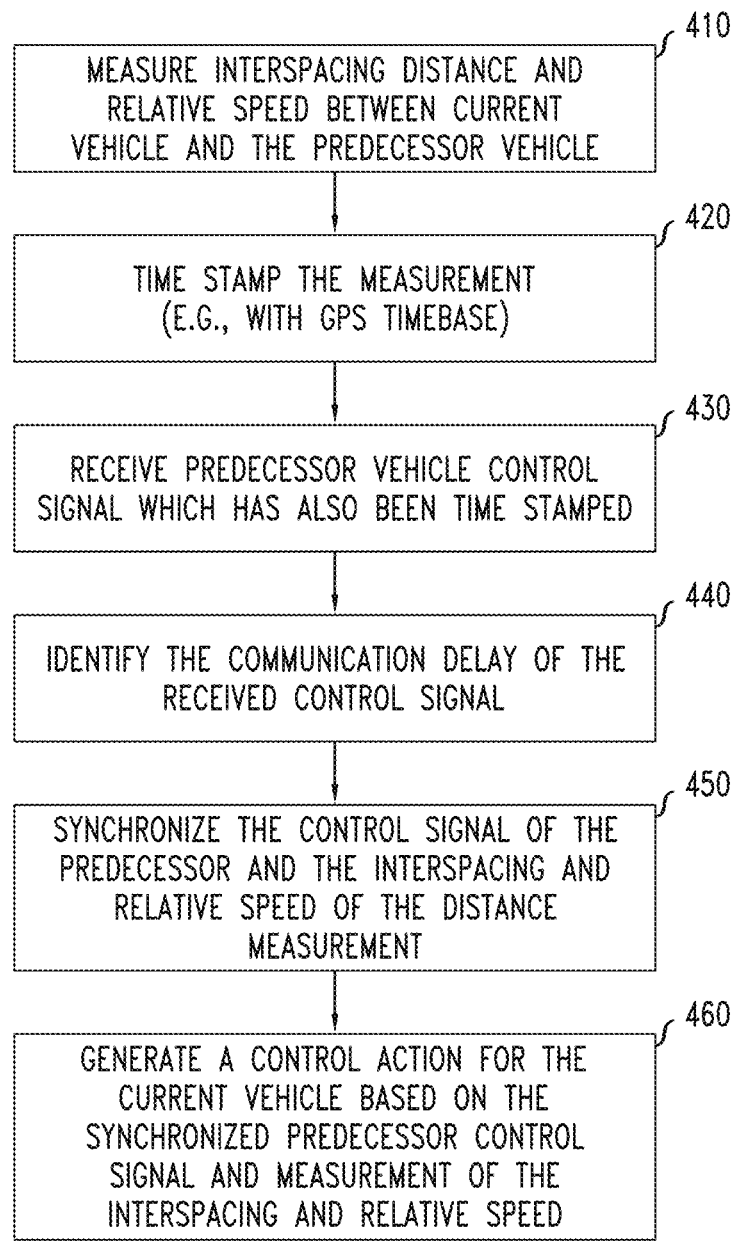
FIG. 4 is a flowchart illustrating an example of a set of operations for controlling a vehicle according to some embodiments of the present technology.

FIG. 4 is a flowchart illustrating an example of a set of operations 400 for controlling a vehicle according to some embodiments of the present technology. As illustrated in FIG. 4, measurement operation 410 measures the interspacing distance and the relative speed between the current vehicle and the predecessor vehicle. During stamping operation 420, the measurements are time stamped (e.g., with a GPS timebase). Receiving operation 430 receives the predecessor vehicle control signal which has been time stamped at the predecessor vehicle.

Identification operation 440 identifies the communications delay of the received control signal. Using this information, synchronization operation 450 synchronizes the control signal of the predecessor and the interspacing and relative speed measurements. The synchronization of the onboard measurements with the wirelessly received data can induce fixed, commensurate and point-wise time delays in the control mechanism during generating operation 460 and thus avoid the difficulties caused by time-varying or stochastic or distributed time delays.

Figure 5:
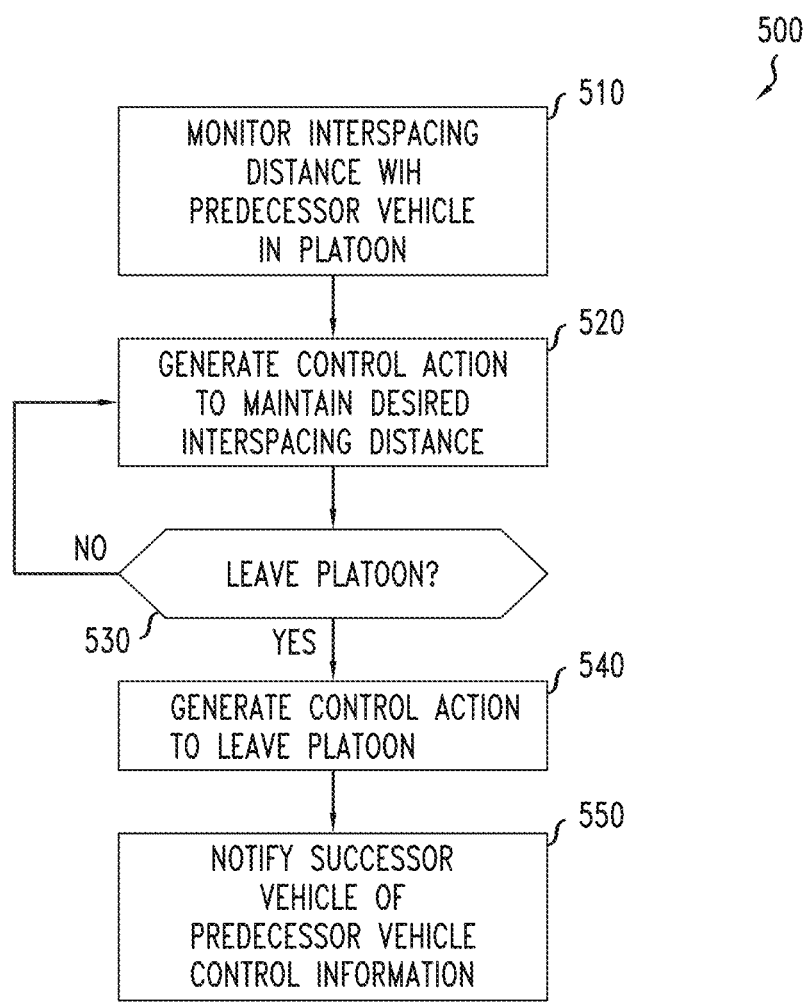
FIG. 5 is a flowchart illustrating an example of a set of operations for operating a platooning vehicle that may leave the platoon in accordance with one or more embodiments of the present technology.

FIG. 5 is a flowchart illustrating an example of a set of operations 500 for operating a platooning vehicle that may leave the platoon in accordance with one or more embodiments of the present technology. As illustrated in FIG. 5, monitoring operation 510 monitors the interspacing distance with the predecessor vehicle (i.e., the vehicle immediately in front of the current vehicle) in the platoon. Generation operation 520 generates a control action to maintain the desired interspacing distance. In accordance with various embodiments, generation operation 520 can be based, at least in part, on the interspacing distance and the control signal from the predecessor vehicle.

Monitoring operation 530 monitors for an indication that the vehicle is leaving the platoon. This indication may be triggered manually or automatically. For example, a drive may press a button or provide another indication (e.g., voice command) that the vehicle should leave the platoon. As another example, the indication may be trigger from a fault tolerant detection system that indicates there are one or more potential problems with the vehicle (e.g., communication failure, braking issue, throttling problem, etc.). If monitoring operation 530 determines that the vehicle should not leave the platoon, then monitoring operation 530 branches to monitoring operation 510 where the interspacing distance is monitored. If monitoring operation 530 determines that the vehicle should leave the platoon, then monitoring operation 530 branches to generation operation 540 where a control action is generated to leave the platoon (e.g., a lane change). During notification operation 550, the successor vehicle is notified of the predecessor's control information. Once the vehicle has left the platoon, the only needed reconfiguration is at the successor vehicle, who must acknowledge the numerical identifying code of the vehicle in front of it, which may serve as a parameter for its on board controller and receive the transmitted control signal of the vehicle in front of it. The control mechanism described in some embodiments will automatically regulate the interspacing error between the successor and the vehicle in front of it, which in some embodiments may be viewed as an impulse disturbance signal.

In some embodiments which will be described in detail, a (semi)autonomous vehicle equipped with the current technology may choose as a predecessor, a vehicle whose control signal is not automatically generated (e.g. a vehicle manually operated by a human) or choose as a predecessor a vehicle that is not equipped with the current technology and therefore does not transmit its control signal. Such a predecessor vehicle will therefore become the leader vehicle of the platoon formation.

Figure 6:
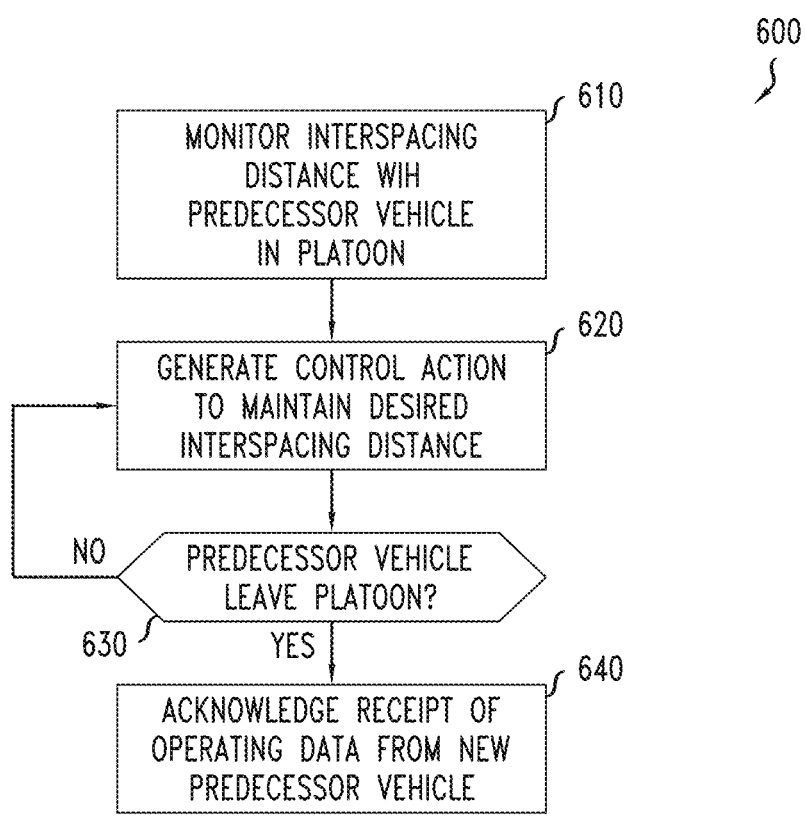
FIG. 6 a flowchart illustrating an example of a set of operations for operating a platooning vehicle whose predecessor vehicle may leave the platoon formation according to one or more embodiments of the present technology.

FIG. 6 a flowchart illustrating an example of a set of operations 600 for operating a platooning vehicle whose predecessor vehicle may leave the platoon formation according to one or more embodiments of the present technology. As illustrated in FIG. 6, monitoring operation 610 monitors the interspacing distance with the predecessor vehicle (i.e., the vehicle immediately in front of the current vehicle) in the platoon. Generation operation 620 generates a control action to maintain the desired interspacing distance. In accordance with various embodiments, generation operation 620 can be based, at least in part, on the interspacing distance and the control signal from the predecessor vehicle.

Monitoring operation 630 monitors for an indication that the predecessor vehicle is leaving the platoon. This indication may be a signal from the predecessor vehicle. If monitoring operation 630 determines that the predecessor vehicle has not leave the platoon, then monitoring operation 630 branches to monitoring operation 610 where the interspacing distance is monitored. If monitoring operation 630 determines that the vehicle should leave the platoon, then monitoring operation 630 branches to operation 640 which acknowledges the numerical identifying code of the new predecessor vehicle (numerical code which may serve as a parameter for its on board controller) and receive the transmitted control signal of the new predecessor vehicle. The control mechanism described in some embodiments will automatically regulate the interspacing error between the vehicle and its predecessor vehicle, which in some embodiments described later in detail, may be viewed as an impulse disturbance signal.

As a result of a predecessor vehicle leaving the platoon formation, the vehicle might become the leader vehicle (the first vehicle) of the platoon. In such a situation, an indication may be issued to the driver who might take full manual control of the vehicle.

Most of the notation used hereinafter is quite standard in the systems and control literature. The Laplace transform complex variable is $s \in \square$ and the Laplace transform of the real signal u(t) will be typically denoted with u(s) and can be distinguished by the change in the argument. When the time argument •(t) or the frequency argument •(s) can be inferred from the context or is irrelevant, it is omitted.

Table I contains notation for certain structured matrices which will be used. Assume the following notation:

TABLE I

NOTATION FOR STRUCTURED MATRICES

| D $\{d_1, d_2, \ldots, d_n\}$ | $\begin{bmatrix} d_1 & 0 & 0 & \cdots & 0 \\ 0 & d_2 & 0 & \cdots & 0 \\ 0 & 0 & d_3 & \cdots & 0 \\ \vdots & \vdots & \vdots & \ddots & \vdots \\ 0 & 0 & 0 & \cdots & d_n \end{bmatrix}$ |
|---|---|
| T $\{t_1, t_2, \ldots, t_n\}$ | $\begin{bmatrix} t_1 & 0 & 0 & \cdots & 0 & 0 \\ t_2 & t_1 & 0 & \cdots & 0 & 0 \\ t_3 & t_2 & t_1 & \cdots & 0 & 0 \\ \vdots & \vdots & \vdots & \ddots & \vdots & \vdots \\ t_{n-1} & t_{n-2} & t_{n-3} & \cdots & t_1 & 0 \\ t_n & t_{n-1} & t_{n-2} & \cdots & t_2 & t_1 \end{bmatrix}$ |

TABLE I-continued

NOTATION FOR STRUCTURED MATRICES $$R\{r_1, r_2, \ldots, r_n\} \quad \begin{bmatrix} r_1 & 0 & 0 & \cdots & 0 \\ r_2 & r_2 & 0 & \cdots & \\ r_3 & r_3 & r_3 & \cdots & 0 \\ \vdots & \vdots & \vdots & \cdots & \vdots \\ r_n & r_n & r_n & \cdots & r_n \end{bmatrix}$$

Figure 7:
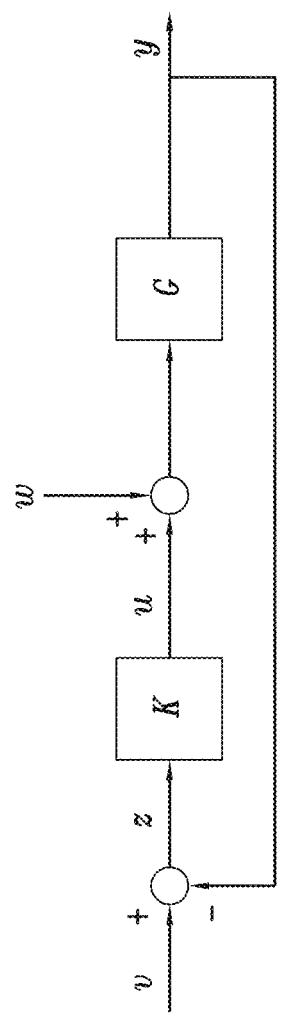
FIG. 7 is a block diagram illustrating a unity feedback loop of a plant G with a controller K.

$x \overset{def}{=} y$ x is by definition equal to y
R (s) Set of all real-rational transfer functions.
$R(s)^{p \times q}$ Set of p×q matrices having all entries in R(s)
LTI Linear and Time Invariant
TFM Transfer Function Matrix
$Q_{ij}$ The i-th row, j-th column entry of $Q \in R(s)^{p \times q}$
P★u(t) The time response with zero initial conditions of an (LTI) system with TFM P and input u(t)
$T_{z_i w_j}$ The i-th row, j-th column entry of the TFM $T_{zw} \in \Box(s)^{p \times q}$, mapping input vector w to output vector z FIG. 7 illustrates the standard unity feedback configuration where G is a multivariable (strictly proper) LTI plant and K is an LTI controller. Here, w and v are the input disturbance and sensor noise, respectively, and u and z are the controls and measurements vectors, respectively. The T superscript denotes matrix transposition.

Denote by $$H(G, K) = \begin{bmatrix} T_{zw} & T_{zv} \\ T_{uw} & T_{uv} \end{bmatrix} \overset{def}{=} \begin{bmatrix} -(I+GK)^{-1}G & (I+GK)^{-1} \\ K(I+KG)^{-1}G & K(I+GK)^{-1} \end{bmatrix} \quad (1)$$

the closed-loop TFM of FIG. 7 from the exogenous signals $[w^T v^T]^T$ to $[z^T u^T]^T$. A certain TFM is stable if it has all its poles in the open left complex half-plane, and unimodular if it is square, proper, stable and has a stable inverse. If H(G,K) is stable then K is a stabilizing controller of G, or equivalently that K stabilizes G.

Given a square plant $G \in \Box(s)^{n \times n}$, a right coprime factorization of G is a fractional representation of the form $G = NM^{-1}$ with both factors $N, M \in \Box(s)^{n \times n}$ being stable and for which there exist $X, Y \in \Box(s)^{n \times n}$ also stable, satisfying $YM + XN = I_n$, with $I_n$ being the identity matrix. Analogously, a left coprime factorization of G is defined by $G = \tilde{M}^{-1} \tilde{N}$, with $\tilde{N}, \tilde{M} \in \Box(s)^{n \times n}$ both stable and satisfying $\tilde{M}\tilde{Y} + \tilde{N}\tilde{X} = I_n$, for certain stable TFMs $\tilde{X}, \tilde{Y} \in \Box(s)^{n \times n}$.

A collection of eight stable TFMs (M,N, $\tilde{M},\tilde{N}$, X,Y, $\tilde{X},\tilde{Y}$) is called a doubly coprime factorization of G if $\tilde{M}$ and M are invertible, yield the factorizations $G = \tilde{M}^{-1}\tilde{N} = NM^{-1}$, and satisfy the following equality (Bézout's identity):

$$\begin{bmatrix} -\tilde{N} & \tilde{M} \\ Y & X \end{bmatrix} \begin{bmatrix} -\tilde{X} & M \\ \tilde{Y} & N \end{bmatrix} = I_{2n}. \quad (2)$$

Let (M,N, $\tilde{M},\tilde{N}$, X,Y, $\tilde{X},\tilde{Y}$) be a doubly coprime factorization of G. Any controller $K_Q$ stabilizing the plant G, in the feedback interconnection of FIG. 7, can be written as $$K_Q = Y_Q^{-1} X_Q = \tilde{X}_Q \tilde{Y}_Q^{-1}, \quad (3)$$

where $X_Q$, $\tilde{X}_Q$, $Y_Q$ and $\tilde{Y}_Q$ are defined as:

$$X_Q \overset{def}{=} X + Q\tilde{M}, \tilde{X}_Q \overset{def}{=} \tilde{X} + MQ, Y_Q \overset{def}{=} Y - Q\tilde{N}, \tilde{Y}_Q \overset{def}{=} \tilde{Y} - NQ \quad (4)$$

for some stable Q in $\Box(s)^{n \times n}$. It also holds that $K_Q$ from (3) stabilizes G, for any stable Q in $\Box(s)^{n \times n}$.

Starting from any doubly coprime factorization (2), the following identity $$\begin{bmatrix} -\tilde{N} & \tilde{M} \\ Y_Q & X_Q \end{bmatrix} \begin{bmatrix} -\tilde{X}_Q & M \\ \tilde{Y}_Q & N \end{bmatrix} = I_{2n}. \quad (5)$$

provides an alternative doubly coprime factorization of G, for any stable $Q \in \Box(s)^{n \times n}$.

For any stabilizing controller $K_Q$ from (3), the expression of the closed-loop $H(G, K_Q)$ takes the form $$\begin{bmatrix} T_{zw} & T_{zv} \\ T_{uw} & T_{uv} \end{bmatrix} = \begin{bmatrix} -\tilde{Y}_Q \tilde{N} & \tilde{Y}_Q \tilde{M} \\ -\tilde{X}_Q \tilde{N} & \tilde{X}_Q \tilde{M} \end{bmatrix} \quad (6)$$

where the block-wise partition in the identity (6) is in accordance with the definitions of (1).

Various embodiments of the present technology consider a platoon of one leader and $n \in \Box$ follower vehicles traveling in a straight line along a highway, in the same (positive) direction of an axis with origin at the starting point of the leader. Henceforth, the "0" index will be reserved for the leader. Denote by $y_0(t)$ the time evolution of the position of the leader vehicle, which can be regarded as the "reference" for the entire platoon. The dynamical model for the k-th vehicle in the string, (0≤k≤n) is described by its corresponding LTI, continuous-time, finite dimensional transfer function $G_k(s)$ from its controls $u_k(t)$ to its position $y_k(t)$ on the roadway. While in motion, the k-th vehicle is affected by the disturbance $w_k(t)$, additive to the control input $u_k(t)$, specifically $$y_k(t) G_k \star (w_k(t) + u_k(t)) \quad (7)$$

The control signal $u_0(t)$ of the leader's vehicle may not be automatically generated in some embodiments. In some embodiments, the leader vehicle may or may not have a controller on board. Whether the control signal is automatically generated or not, both $u_0$ and $w_0$ act as reference signals for the entire platoon.

One of the goals in some embodiments is for every vehicle in the string to follow the leader while maintaining a certain inter-vehicle spacing distance which denoted with Δ. If the inter-vehicle spacing policy is assumed to be constant then Δ is given as a pre-specified positive constant. Under the standard assumptions that all vehicles start at rest $$\left( \frac{dy_k}{dt}(0) = \text{for } 0 \leq k \leq n \right)$$

and from the initial desired formation ($y_k(0) = -k\Delta$ for 0≤k≤n), the time evolution for the position of each vehicle becomes:

$$y_k(t) = G_k \star (u_k(t) + w_k(t)) - k\Delta, \text{ for } 0 \leq k \leq n. \quad (8)$$

Denote with $z_k(t)$ the inter-vehicle spacing errors defined as $$z_k(t) \overset{def}{=} y_{k-1}(t) - y_k(t) - \Delta, \text{ for } 1 \leq k \leq n \quad (9)$$

One of the objectives of the control mechanism in various embodiments is to attenuate the effect of the disturbances $w_k$, (0≤k≤n), and of the leader's control signal $u_0$ at each member of the platoon, such as to maintain the spacing errors (9) as close to zero as possible. This "small errors" performance must be attained asymptotically (in steady state) and for a constant speed of the leader. The error signals relate to the performance metrics associated with the platoon (as an aggregated system) when considering safety margins and traffic throughput.

There is no loss of generality in assuming that $\Delta=0$ in equation (8) or in considering vehicles with different lengths, since these parameters can be "absorbed" as needed in the spacing error signals (9).

In practice an inter-vehicle spacing policy that is proportional with the vehicle's speed $$\frac{dy_k}{dt}(t)$$

(dubbed time headway) is preferred to the constant policy (9). Various time headway policies have been known to have beneficial effects on certain stability measures of the platoon's behavior. For a constant time headway $h>0$, the expression of the spacing errors becomes $$z_k(t) \stackrel{def}{=} y_{k-1}(t) - \left(y_k(t) + h\frac{dy_k}{dt}(t)\right) \quad (10)$$

where $$\frac{dy_k}{dt}(t)$$

is the speed of the k-th vehicle. Under the aforementioned "zero" error initial conditions the vehicle inter-spacing errors can be written as:

$$z_{k+1} = G_k \star (u_k + w_k) - HG_{k+1} \in (u_{k+1} + w_{k+1}), 0 \le k \le (n-1), \quad (11)$$

where $$H(s) \stackrel{def}{=} hs+1, h>0. \quad (12)$$

Next, the following standard notation for the aggregated signals of the platoon will be used:

$$z \stackrel{def}{=} [z_1 z_2 \ldots z_n]^T, w \stackrel{def}{=} [w_1 w_2 \ldots w_n]^T, u \stackrel{def}{=} [u_1 u_2 \ldots u_n]^T. \quad (13)$$

Define $T \in \square(s)^{n \times n}$ a $$T \stackrel{def}{=} \begin{bmatrix} H & O & O & \cdots & O \\ -1 & H & O & \cdots & O \\ O & -1 & H & \cdots & O \\ \vdots & \vdots & \vdots & & \vdots \\ O & O & O & \cdots & H \end{bmatrix} \quad (14)$$

while noting that its inverse is $$T^{-1} = T\{H^{-1}, H^{-2}, K, H^{-n}\} = \begin{bmatrix} H^{-1} & O & O & \cdots & O \\ H^{-2} & H^{-1} & O & \cdots & O \\ H^{-3} & H^{-2} & H^{-1} & \cdots & O \\ \vdots & \vdots & \vdots & \ddots & \vdots \\ H^{-n} & H^{-n+1} & H^{-n+2} & \cdots & H^{-1} \end{bmatrix} \quad (15)$$

Rewriting (11) for all $0 \le k \le (n-1)$ in a matrix form to obtain $$\begin{bmatrix} z_1 \\ z_2 \\ z_3 \\ \vdots \\ z_n \end{bmatrix} = \begin{bmatrix} 1 \\ O \\ O \\ \vdots \\ O \end{bmatrix} G_0 \star (u_0 + w_0) - \begin{bmatrix} HG_1 & O & O & \cdots & O \\ -G_1 & HG_2 & O & \cdots & O \\ O & -G_2 & HG_3 & \cdots & O \\ \vdots & \vdots & \vdots & & \vdots \\ O & O & O & \cdots & HG_n \end{bmatrix} \quad (16)$$

$$\star \begin{bmatrix} (u_1 + w_1) \\ (u_2 + w_2) \\ (u_3 + w_3) \\ \vdots \\ (u_n + w_n) \end{bmatrix}$$

In view of (16), $G \stackrel{def}{=} TD\{G_1, G_2, \ldots, G_n\}$ can be used to denote the aggregated TFM of the platoon, from the controls vector u to the error signals vector z. Henceforward, G will be referred to as the platoon's plant.

With this notation equation (16) can be expressed as $$z = V_1 G_0 \star (u_0 + w_0) - G \star (u+w), \quad (17)$$

where $V_1 \stackrel{def}{=} [1 \ 0 \ \ldots \ 0]^T$ is the first column vector of the Euclidian basis in $\square^n$. In our platooning framework the measurements of the platoon's plant are the errors signals z, representing the input signals of the controller $K_Q \in \square(s)^{n \times n}$, therefore the equation for the controls vector reads $$u(t) = K_Q \star z(t). \quad (18)$$

To bridge the gap between our platooning control problem and the generic unity feedback scheme from FIG. 7, (18) can be plugged into (17) in order to obtain the closed-loop H $(G, K_Q)$ of the platoon (as an aggregated system).

Given a doubly coprime factorization (2) of the platoon's plant G and a controller $K_Q$ (3) then $$z = T_{zw_0} \star (u_0 + w_0) + T_{zw} \star w, \quad (19a)$$

$$u = T_{uw_0} \star (u_0 + w_0) + T_{uw} \star w, \quad (19b)$$

where $T_{zw_0} \stackrel{def}{=} (I + GK_Q)^{-1} V_1 G_0$ and $T_{uw_0} \stackrel{def}{=} K_Q (I + GK_Q)^{-1} V_1 G_0$ are the TFMs from the leader's controls and disturbances $(u_0 + w_0)$ to the interspacing errors z and control signals u, respectively, while $T_{zw}$ and $T_{uw}$ are as defined in (1), for $K = K_Q$. In particular, it holds that $$\begin{bmatrix} T_{zw_0} & T_{zw} \\ T_{uw_0} & T_{uw} \end{bmatrix} = \begin{bmatrix} \tilde{Y}_Q \tilde{M} V_1 G_0 & -\tilde{Y}_Q \tilde{N} \\ \tilde{X}_Q \tilde{M} V_1 G_0 & -\tilde{X}_Q \tilde{N} \end{bmatrix}. \quad (20)$$

This can be seen by plugging (18) into (17) in order to get (19a). Next, note that because of (1) it holds that $T_{zw_0} = T_{zv} V_1 G_1$ and substitute accordingly the expression from (6) of into (19a) in order to obtain $T_{zw_0}$ in (20). By plugging (18) into (17) gives $u = K_Q(V_1 G_0 \star (u_0 + w_0) - G \star w - G \star u)$ which yields (19b). Note that also because of (1) it holds that $T_{uw_0} = T_{uv} V_1 G_0$ and substitute accordingly the expression from (6) into (19b) in order to get $T_{uw_0}$ in (20). The remaining expressions in (20) follow directly from the results presented above.

Clearly, from (20) it appears that the stability of $T_{zw_0}$ or $T_{uw_0}$ cannot be guaranteed by an internally stabilizing controller $K_Q$ for any leader dynamics $G_0$. However, this issue can be solved under lenient assumptions, as explained later in the sequel.

A controller $K_Q \in \square(s)^{n \times n}$ is said to be a leader information controller, if $K_Q$ stabilizes the platoon's plant G in the feedback configuration of FIG. 7 and the TFM $T_{zw_0} = (I_n + GK_Q)^{-1}$ from the disturbances at the leader to the errors is diagonal.

It turns out that imposing bi-diagonal sparsity constraints on the closed-loop TFM $(I_n + GK_Q)^{-1}$ (from the disturbances to the leader $w_0(t)$ to the errors vector $z(t)$) arises as a natural performance condition in multi-agent platooning systems due to the fact that such sparsities of the closed-loop TFMs are intimately related to the manner in which the disturbances propagate through the string formation.

The vehicle's linearized dynamics are commonly modeled in the literature as a second order system including damping or as a double integrator with first order actuator dynamics. In some embodiments, heterogeneous vehicles properties may be modeled with the distinct masses and the distinct actuating time constants corresponding to the different types of vehicles in the platoon (e.g. heavy vehicles versus automobiles).

The dynamical model $G_k$ for each vehicle k, $0 \le k \le n$, equals a given strictly proper transfer function $G_\wp(s) \in \square(s)$ weighted by a unimodular factor $\Phi_k \in \square(s)$, specifically $G_k \overset{def}{=} \Phi_k G_\wp$ where we call a transfer function matrix unimodular if it is stable and has a stable invers. The expression of the platoon's plant therefore becomes $G = T \Phi G_\wp$.

One possible embodiment could comprise of a point-mass model comprising of the double integrator with a first order actuator ($\rho_k > 0$), $$G_k(s) = \frac{s + \sigma_k}{m_k s^2 (\rho_k s + 1)}, \text{ for } 1 \le k \le n, \quad (21)$$

$G_\wp$ would be the double integrator $1/s^2$ and $\Phi_k$ would be equal to $$\frac{s + \sigma_k}{m_k(\rho_k s + 1)}$$

with $\sigma_k > 0$, where $m_k$ and $\rho_k$ are the mass and actuator time constant respectively, specific to the k-th vehicle.

Since zero at $-\sigma_k$ in the expression of $\Phi_k$ is stable, it actually does not introduce important restrictions, and can be cancelled in closed-loop.

In some embodiments, the transfer function $G_\wp$ described above may include a conveniently designed Pade rational approximation of $e^{-\tau_k s}$ where $\tau_k$ is the time delay of the vehicle's electro-hydraulic brake and throttle actuating system. The actuating time delay $\tau_k$ may be the same for all n vehicles in the platoon, and the leader vehicle or different vehicles in the string may have different time delay actuating constants $\tau_k$. A common time delay constant for all vehicles in the string may be negotiated between the vehicles in the string using communications protocols, and it may be implemented by the synchronization mechanism present onboard each vehicle.

Such a common time delay constant may be chosen to be greater or equal to the maximum of the actuating time delays of all vehicles present in formation. Such a common time delay may be chosen to greater or equal with the maximum of the latencies of the vehicles in the string and it may be implemented by the synchronization mechanism. The vehicle latency has been defined earlier. The actuating time delay $\tau_k$ for each vehicle is known in practice from the vehicle's technical specifications and can be further certified through model validation methods. It is also known that the Pade approximation will introduce non-minimal phase zeros in $G_\wp$ and therefore some loss of performance.

The Youla Parameterization of all Leader Information Controllers

This subsection describes the Youla parameterization of all leader information controllers associated with a given platoon of vehicles. Some embodiments can be formulated in terms of a particular doubly coprime factorization of the platoon's plant, whose factors feature certain sparsity patterns. Parameterizing all leader information controllers translates into restricting the set of the Youla parameters only to those having a diagonal TFM.

The n×n Transfer Function Matrix ($H^{-1}T$) with the constant time-headway $H(s) = 1 + hs$, (with $h > 0$) and T as defined in (14) is a unimodular TFM.

This statement follows from the fact that ($H^{-1}T$) has all its poles and all its Smith zeros at $$-\frac{1}{h},$$

where $h > 0$ as specified in (12).

Let ($M_\wp, N_\wp, \tilde{M}_\wp, \tilde{N}_\wp, X_\wp, Y_\wp, \tilde{X}_\wp, \tilde{Y}_\wp$) be a doubly coprime factorization of $G_\wp$, where all eight factors are scalar rational functions, with $\tilde{N}_\wp$ and $N_\wp$ strictly proper, because $G_\wp$ is assumed strictly proper in Assumption IV.3. Then:

(A) There exists a doubly coprime factorization (2) of G, denoted (M,N, $\tilde{M},\tilde{N}$, X,Y, $\tilde{X},\tilde{Y}$), and having the following expression $$\begin{bmatrix} -\tilde{N} & \tilde{M} \\ Y & X \end{bmatrix} \overset{def}{=} \begin{bmatrix} -N_\wp T \Phi & \tilde{M}_\wp I_n \\ Y_\wp H^{-1} T \Phi & X_\wp H^{-1} I_n \end{bmatrix}, \quad (22a)$$

$$\begin{bmatrix} -\tilde{X} & M \\ \tilde{Y} & N \end{bmatrix} = \begin{bmatrix} -\Phi^{-1} T^{-1} \tilde{X}_\wp & \Phi^{-1} T^{-1} H M_\wp \\ \tilde{Y}_\wp I_n & H N_\wp I_n \end{bmatrix}; \quad (22b)$$

(B) The Youla parameterization (3) of all leader information stabilizing controllers (from Definition IV.1) is obtained from the doubly coprime factorization (22) by constraining the Youla parameters $Q \in \square(s)^{n \times n}$ to be diagonal, specifically $Q \overset{def}{=} D\{Q_{11}, Q_{22}, \ldots, Q_{nn}\}$, with $Q_{kk} \in \square(s)$ stable, for any $1 \le k \le n$. Moreover, any leader information controller $K_Q$ is given by a left coprime factorization of the form $$[Y_Q X_Q] \overset{def}{=} [(H^{-1} Y_\wp I_n - \tilde{N}_\wp Q) T \Phi (H^{-1} X_\wp I_n + \tilde{M}_\wp Q)]. \quad (23)$$

The detailed expressions of the factors $Y_Q$ and $X_Q$ are given by $$Y_Q = \begin{bmatrix} (Y_\wp - Q_{11}H\tilde{N}_\wp)\Phi_1 & 0 & 0 & \cdots & 0 \\ (-H^{-1}Y_\wp + Q_{22}\tilde{N}_\wp)\Phi_1 & (Y_\wp - Q_{22}H\tilde{N}_\wp)\Phi_2 & 0 & \cdots & 0 \\ 0 & (-H^{-1}Y_\wp + Q_{33}\tilde{N}_\wp)\Phi_2 & (Y_\wp - Q_{33}H\tilde{N}_\wp)\Phi_3 & \cdots & 0 \\ \vdots & \vdots & \vdots & \vdots & \vdots \\ 0 & 0 & 0 & \cdots & (Y_\wp - Q_{nn}H\tilde{N}_\wp)\Phi_n \end{bmatrix} \quad (24a)$$

$$X_Q = \begin{bmatrix} (H^{-1}X_\wp + Q_{11}\tilde{M}_\wp) & 0 & 0 & \cdots & 0 \\ 0 & (H^{-1}X_\wp + Q_{22}\tilde{M}_\wp) & P & \cdots & 0 \\ 0 & P & (H^{-1}X_\wp + Q_{33}\tilde{M}_\wp) & \cdots & 0 \\ \vdots & \vdots & \vdots & \vdots & \vdots \\ 0 & 0 & 0 & \cdots & (H^{-1}X_\wp + Q_{nn}\tilde{M}_\wp) \end{bmatrix} \quad (24b)$$

Statement (A) can be seen by the fact that both $T^{-1}$ from (15) and $HT^{-1}$ from Proposition IV.6 are stable, implies that all eight factors from (22) are stable. The rest of the proof follows by the inspection of (22) which complies with the definition from (2). Statement (B) The TFM of interest $(I_n+GK_Q)^{-1}$ is diagonal if and only if $(I_n+GK_Q)^{-1}(\tilde{M}_\wp I_n)^{-1} = \tilde{Y}_Q$ is diagonal. The latter holds if and only if $(\tilde{Y}_Q - \tilde{Y}_\wp I_n)$ is diagonal. But from the expression for $Y_Q$ from (4) applied to the factorization in (22) it follows that $\tilde{Y}_Q = \tilde{Y}_\wp I_n + (HN_\wp)Q$ and since neither $N_\wp$, nor $H$ are identically zero, clearly $\tilde{Y}_Q$ is diagonal if and only if the Youla parameter $Q$ is a diagonal TFM. The formulas from (24) follow directly.

Distributed Implementation of Leader Information Controllers

This subsection introduces a distributed implementation for leader information controllers that can be used in various embodiments of the present technology.

Any of the leader information controllers $K_Q$, $u=K_Q z$, parameterized in above can be rewritten as $$u = H^{-1}\Phi_{ldiag} \star u + H^{-1} K \star z \quad (25)$$

with $$\Phi_{ldiag} \stackrel{def}{=} \begin{bmatrix} 0 & 0 & 0 & \cdots & 0 & 0 \\ \Phi_2^{-1}\Phi_1 & 0 & 0 & \cdots & 0 & 0 \\ 0 & \Phi_3^{-1}\Phi_2 & 0 & \cdots & 0 & 0 \\ 0 & 0 & \Phi_4^{-1}\Phi_3 & \cdots & 0 & 0 \\ \vdots & \vdots & \vdots & \ddots & \vdots & \vdots \\ 0 & 0 & 0 & \cdots & \Phi_n^{-1}\Phi_{N-1} & 0 \end{bmatrix} \quad (26)$$

$$K \stackrel{def}{=} D\{K_1, K_2, \ldots, K_n\}, K_k \stackrel{def}{=} \Phi_k^{-1}(Y_\wp - Q_{kk}H\tilde{N}\wp)^{-1}(X_\wp + Q_{kk}H\tilde{M}\wp), \text{ with } K_k \in \square(s), \quad (27)$$

for any $1 \leq k \leq n$.

This follows directly by multiplying to the left coprime factorization (23) of $K_Q$ with the diagonal TFM $$D\{\Phi_1^{-1}H^{-1}(H^{-1}Y_\wp - Q_{11}\tilde{N}\wp)^{-1}, \Phi_2^{-1}H^{-1}(H^{-1}Y\wp - Q_{22}\tilde{N}\wp)^{-1}, \ldots, \Phi_n^{-1}H^{-1}(H^{-1}Y\wp - Q_{nn}\tilde{N}\wp)^{-1}\}$$

Figure 8:
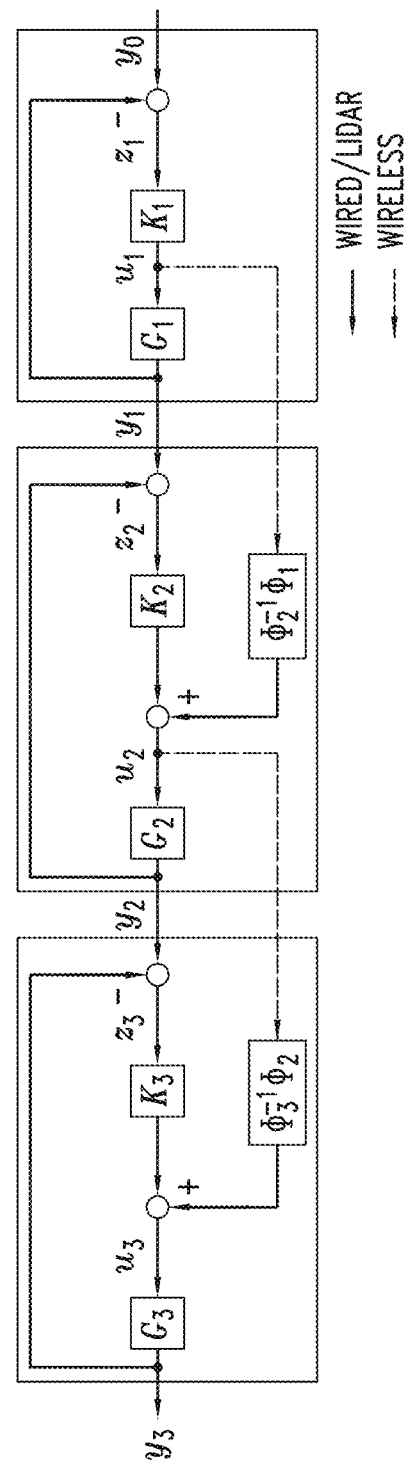
FIG. 8 is a block diagram illustrating an example of a leader information control for the first three vehicles in the string, in accordance with some embodiments of the present technology.
Figure 9:
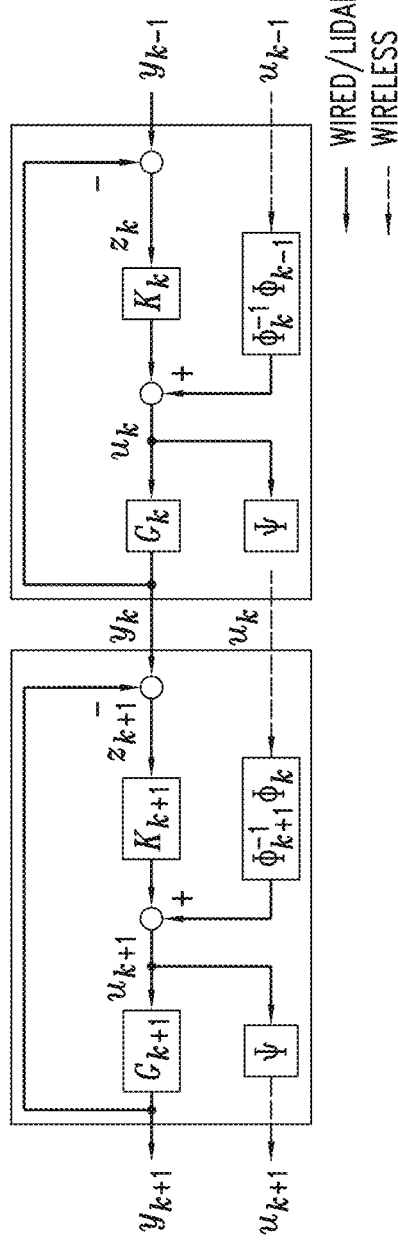
FIG. 9 is a block diagram illustrating an example of a leader information control in accordance with some embodiments of the present technology.

A distributed implementation of the leader information controller is presented in FIG. 8 for the first three vehicles of the platoon. The scheme for any two consecutive vehicles in the platoon ($k \geq 2$) is depicted in FIG. 9 where the $\Psi$ blocks are considered to be equal to 1. The blocks $G_k$ (with $1 \leq k \leq n$) represent the dynamical models of the vehicles and each control signal $u_k$ is fed in the Electrohydraulic Braking and Throttle actuation system on board the k-th vehicle. The $z_k$ measurement, represents the distance to the preceding vehicle and it is measured using ranging sensors on board the k-th vehicle. The control signal $u_{k-1}$ produced on board the (k−1)-th vehicle is broadcasted (e.g., using wireless communications) to the k-th vehicle. The blocks T are taken to be 1 in FIG. 9 under the assumption that there are no (wireless) communications induced delays.

To make the graphics more readable, FIG. 8 and FIG. 9 illustrate the case in which the constant time-headway policy has been removed, meaning that $H(s)=1$ is being considered. However, the implementation for $H(s)=hs+1$ with $h>0$ should become straightforward from equation (25): simply add a cascaded $H^{-1}$ filter on each of the $u_k$ and $z_{k+1}$, branches and add a H filter on each feedback branch from $y_k$ to $z_k$ (in accordance to the definition of the error signals $z_k$ from (11)) as described in FIG. 10 and FIG. 11. The $\Phi_k$, $\Phi_{k-1}$, and $K_k$ blocks represent LTI filters and their implementation may be realized by the digital controller onboard each vehicle.

Performance of Leader Information Controllers

This section describes the performance characteristics of leader information controllers. The discussion is twofold: 1) A structural feature of any leader information controller which determines the non-propagation of disturbances downstream the platoon is presented; and 2) How leader information controllers perform in achieving disturbances attenuation (via norm-based costs) are examined.

Structural Properties of Leader Information Controllers

As a structural property of any leader information controller, the resulted closed-loop TFM $T_{zw}$ is lower bidiagonal. This implies that any disturbance $w_j$ (at the j-th vehicle in the platoon) will only impact the $z_j$ and $z_{j+1}$ error signals. Consequently, any disturbance at the j-th vehicle is completely attenuated before even propagating to the (j+2)-th vehicle in the string.

Furthermore, since the TFM $T_{zw_0}$ is diagonal, the disturbances $w_0$ at the leader's vehicle influence only the $z_1$ error signal and none of the subsequent errors $z_k$, with $k \geq 2$. Similarly, the leader's control signal $u_0$ impacts only the $z_1$ error signal, and not at all the subsequent errors $z_k$, with $k \geq 2$. This is relevant to the current discussion, since $u_0$ may not be automatically generated and so it constitutes a reference signal for the entire platoon. This feat of leader information controllers practically eliminates the so-called accordion effect from the behavior of the platoon. In contrast, for any of the predecessor-follower type schemes (including bi-directional or multi look-ahead schemes), since $T_{zw}$ is lower triangular, disturbances at the j-th vehicle—even if attenuated—affect the inter-spacing errors of all its successors in the platoon, therefore exhibiting the accordion effect. The following result provides the exact expressions of the closed-loop TFMs achievable with leader information controllers.

Given a doubly coprime factorization (22) of the platoon's plant G and $Q \stackrel{def}{=} D\{Q_{11}, Q_{22}, \ldots, Q_m\}$ a diagonal Youla parameter, it holds that:

(A) The closed loop transfer function from the disturbance $w_0$ i) to the interspacing error signals $z_k$ is given by $$T_{z_k w_0} = \begin{cases} (\tilde{Y}_\varphi - HN_\varphi Q_{11})\tilde{N}_\varphi \Phi_0, & \text{for } k = 1, \\ 0, & \text{for } k \geq 2; \end{cases} \quad (28)$$

ii) to the control signals $u_k$ is given by $$T_{u_k w_0} = (\tilde{X}_\varphi + HM_\varphi Q_{11})\tilde{N}_\varphi \Phi_0 \Phi_k^{-1} H^{-k}. \quad (29)$$

(B) The closed loop transfer function from the disturbance $w_j$ i) to the error signals $z_k$ is given by $$T_{z_k w_j} = \begin{cases} 0, & \text{for } k < j, \\ -(\tilde{Y}_\varphi - HN_\varphi Q_{jj})\tilde{N}_\varphi H\Phi_j, & \text{for } k = j, \\ (\tilde{Y}_\varphi - HN_\varphi Q_{(j+1)(j+1)})\tilde{N}_\varphi \Phi_j, & \text{for } k = j+1, \\ 0, & \text{for } k > j+1; \end{cases} \quad (30)$$

ii) to the control signals $u_k$ is given by $$T_{u_k w_j} = \begin{cases} 0, & \text{for } k < j, \\ -(\tilde{X}_\varphi + HM_\varphi Q_{jj})\tilde{N}_\varphi, & \text{for } k = j, \\ -M_\varphi (Q_{jj} - Q_{(j+1)(j+1)})\tilde{N}_\varphi \Phi_j \Phi_k^{-1} H^{j+1-k} & \text{for } k > j. \end{cases} \quad (31)$$

These results follow by the inspection of the closed-loop TFMs from the disturbances $w_0$ and w to the errors z and to the control signals u, respectively. The TFM from the disturbances to the errors expressed in terms of the particular doubly coprime factors from (22) reads (according to Proposition III.3)

$$z = (\tilde{Y}_\varphi I_n - HN_\varphi Q)\tilde{M}_\varphi G_\varphi \Phi_0 V_1{}^n \star w_0 - (\tilde{Y}_\varphi - HN_\varphi Q)\tilde{N}_\varphi T\Phi \star w \quad (32)$$

which implies (28) and (30), respectively. Furthermore, the TFM from the disturbances $w_0$ and w respectively, to the controls u expressed in terms of the doubly coprime factors from (22) reads:

$$u = \Phi^{-1} T^{-1}(\tilde{X}_\varphi + HM_\varphi Q)\tilde{M}_\varphi G_\varphi \Phi_0 V_1 \star w_0 - \Phi^{-1} T^{-1}(\tilde{X}_\varphi + HM_\varphi Q)\tilde{N}_\varphi T\Phi \star w \quad (33)$$

which in turn yields (29) and (31), respectively.

In some embodiments, any leader information controller $K_Q$ also stabilizes $T_{zw_0}$ and $T_{uw_0}$.

Note that according to (29), the disturbances $w_0$ affecting the leader vehicle influence the control signals $u_k$ of all other vehicles in the platoon since the controls of all followers act to compensate the effect of $w_0$ on the inter-spacing errors. (The same statement holds true for the leader's controls $u_0$, as well. The leader's controls $u_0$ influence all other control signals $u_k$, with $k \geq 1$.) Interestingly enough, it turns out that this is not necessarily the case for disturbances at the following vehicles. By taking the diagonal Youla parameters to have identical diagonal entries then the closed-loop TFM $T_{uw}(s)$ becomes diagonal and consequently the disturbances $w_j$ at the j-th vehicle are only "felt" on the controls of the j-th vehicle $u_j$ and not at all for its successors.

Considerations on Local and Global Optimality

One of the canonical problems in classical control (dubbed disturbances attenuation) is to design the controller which minimizes some specified norm of the closed-loop TFM from the disturbances w to the error signals z, namely $T_{zw}(s)$. In the platooning setting, an elementary question one should ask is: what level of disturbances attenuation can be attained by leader information controllers with respect to the local performance cost $\|T_{z_j w_j}\|$ from (30) at each vehicle ($1 \leq j \leq n$ in the platoon). The following result shows that constraining the stabilizing controller to be a leader information controller, does not cause any loss in local performance, irrespective of the chosen norm (relative to the performance achievable by the centralized optimal controller).

For any $1 \leq j \leq n$, the minimum in $$\min_{K_Q \text{ stabilizes } G} \|T_{z_j w_j}\| \quad (34)$$

is attained by a leader information controller. The norm in (34) can be taken to be either the $H_2$ or the $H_\infty$ norm.

In order to account for any stabilizing controller $K_Q$ in (34) (possibly centralized controllers), the diagonal constraints on the Youla parameter are removed and generic Youla parameters $Q \in \square(s)^{n \times n}$ are considered. Expressing $T_{zw}$ from (20) in terms of the doubly coprime factorization (22) yields $$T_{zw} = -(\tilde{Y}_\varphi - HN_\varphi Q)\tilde{N}_\varphi T\Phi. \quad (35)$$

Note that since Q is no longer assumed to be diagonal, $T_{zw}$ in (35) is no longer lower bidiagonal. Taking (35) into account for the expression of the cost function in (34) it can be observed that $T_{z_j w_j}$ depends only on the $Q_{jj}, Q_{j(j+1)}$ entries of the Youla parameter, in particular $$T_{z_j w_j} = -\tilde{Y}_\varphi \tilde{N}_\varphi + N_\varphi(Q_{jj} - Q_{j(j+1)})\tilde{N}_\varphi, \text{ for any } 1 \leq j \leq n, \quad (36a)$$

$$T_{z_j w_{j-1}} = \tilde{Y}_\varphi \tilde{N}_\varphi + N_\varphi(Q_{j(j-1)} - Q_{jj})\tilde{N}_\varphi, \text{ for any } 2 \leq j \leq n. \quad (36b)$$

Rewriting (34) in accordance with (36) to get $$\min_{\substack{Q_{jj}, Q_{j(j+1)} \in \square(s) \\ Q_{jj}, Q_{j(j+1)} \text{ stable}}} \|-\tilde{Y}_\varphi \tilde{N}_\varphi H\Phi_j + HN_\varphi(Q_{jj} H - Q_{j(j+1)})\tilde{N}_\varphi \Phi_j\|. \quad (37)$$

It can be observed that if denoting $T_1 \stackrel{def}{=} -\tilde{Y}_\varphi \tilde{N}_\varphi H\Phi_j$ and $T_1 \stackrel{def}{=} [HN_\varphi H\tilde{N}_\varphi \Phi_j, -HN_\varphi \tilde{N}_\varphi \Phi_j]$, with $T_1 \in \square(s)$ and $T_2 \in \square(s)^{1 \times 2}$, then (37) is further equivalent to $$\min_{\substack{Q_{jj}, Q_{j(j+1)} \in \square(s) \\ Q_{jj}, Q_{j(j+1)} \text{ stable}}} \left\| T_1 + T_2 \begin{bmatrix} Q_{jj} \\ Q_{j(j+1)} \end{bmatrix} \right\|, \quad (38)$$

which is a standard model-matching problem which can be solved efficiently for the optimal $Q_{jj}, Q_{j(j+1)}$. Note that after taking all products, the factors involved in the model-matching problem end up being proper transfer functions. The cause of this is the expression (12) of the improper H combined with the fact that both $N_\wp$ and $\tilde{N}_\wp$ are strictly proper. Furthermore, it can be observed that if $Q^*_{jj}, Q^*_{j(j+1)}$ is a solution to (37) then $\tilde{Q}_{jj} = Q^*_{jj} - Q^*_{j(j+1)} H^{-1}, \tilde{Q}_{j(j+1)} = 0$ is also a solution to (37). Therefore the minimum can be attained for each one of the n local cost-functions from (34), via the diagonal Youla parameter $Q^* \stackrel{def}{=} D\{\tilde{Q}_{11}, \tilde{Q}_{22}, \ldots, \tilde{Q}_m\}$, which plugged into (24) yields the optimal leader information controller.

Practical $H_\infty$ Criterion for Controller Design

The j-th Local Problem. In practice, the local performance objective at the j-th vehicle in the platoon ($1 \le j \le n$) is formulated as to minimize the effect of the disturbances $w_j$ (at the j-th vehicle) both on the interspacing error $z_j$ and on the control effort $u_j$, namely $$\min_{\substack{K_Q \text{ stabilizes } G \\ K_Q \text{ leader information controller}}} \left\| \begin{bmatrix} T_{z_j w_j} \\ T_{u_j w_j} \end{bmatrix} \right\|_\infty \quad (39)$$

The closed-loop TFM from the disturbances to the controls is included in the cost in order to avoid actuator saturation, to regulate the control effort but also to set "the road attitude" of the j-th vehicle. The $H_\infty$ norm is used in order to guarantee attenuation in "the worst case scenario". The problem in (39) is referred to as the j-th local problem. A convenient feature of the leader information controllers is that both closed-loop terms $T_{z_j w_j}$ and $T_{u_j w_j}$ involved in the cost functional of (39) depend only on the $Q_{jj}$ entry of the diagonal Youla parameter. Therefore, while performing the minimization in (39) after all stabilizing leader information controllers, the j-th local problem (39) can be recast as the following $H_\infty$ model-matching problem:

$$\min_{\substack{Q_{jj} \in \mathbb{D}(s) \\ Q_{jj} \text{ stable}}} \left\| \begin{bmatrix} -\tilde{Y}_\wp H \Phi_j \\ -\tilde{X}_\wp \end{bmatrix} \tilde{N}_\wp + H \tilde{N}_\wp \begin{bmatrix} N_\wp H \Phi_j \\ -M_\wp \end{bmatrix} Q_{jj} \right\|_\infty. \quad (40)$$

Note that (40) can be efficiently solved for $Q_{jj}$ using existing $H_\infty$ synthesis numerical routines. Furthermore, a leader information controller can be always be designed that simultaneously solves the local problems for each one of the n vehicles in the string. This is done by solving independently (in parallel, if needed) each j-th local problem, for the j-th diagonal entry $Q_{jj}$ of the Youla parameter. When plugged into the leader controller parameterization, the resulted diagonal Youla parameter yields the expression for the local controllers $K_k$ to be placed on board the k-th vehicle, ($1 \le k \le n$).

The local performance objectives imposed in (39) are not sufficient to guarantee the overall behavior of the platoon. The standard analysis for platooning systems must take into account the effects of the disturbance $w_j$ (at any j-th vehicle in the platoon or at the leader) on the errors $z_k$ and controls $u_k$, for all successors in the string (k>j). As a bonus feature of leader information controllers, the effect of the disturbances $w_j$ on any of its successors k in the string does not formally depend on the number (k−j) of in-between vehicles but only on the following factors: (i) the attenuations obtained at the j-th and (j+1)-th local problems, respectively (which are optimized by design in (39)); (ii) the stable, minimum phase dynamics $\Phi_j$ and $\Phi_k$ particular to the j-th and the k-th vehicle, respectively; and (iii) the constant time-headway H. In particular, the effect of the disturbances $w_0$ at the leader on any successor $k \ge 1$ in the string depends on the following: (i) the attenuation obtained at the 1-st local problem; (ii) the stable, minimum phase dynamics $\Phi_0$ and $\Phi_k$ particular to the leader and the k-th vehicle, respectively; and (iii) the constant time-headway H. The precise statement follows:

For any leader information controller, the propagation effect of the disturbances towards the back of the platoon (sensitivity to disturbances) is bounded as follows:

(A) The amplification of the disturbance $w_0$ (to the leader's vehicle) on i) the first vehicle in the platoon is given by $$\left\| \begin{bmatrix} T_{z_1 w_0} \\ T_{u_1 w_0} \end{bmatrix} \right\|_\infty = \quad (41)$$

$$\left\| -\Phi_1^{-1} \Phi_0 H^{-1} \begin{bmatrix} T_{z_1 w_1} \\ T_{u_1 w_1} \end{bmatrix} \right\|_\infty \le \| \Phi_1^{-1} \Phi_0 H^{-1} \|_\infty \left\| \begin{bmatrix} T_{z_1 w_1} \\ T_{u_1 w_1} \end{bmatrix} \right\|_\infty;$$

ii) the k-th vehicle in the platoon, with $k \ge 2$, is given by $$\left\| \begin{bmatrix} T_{z_k w_0} \\ T_{u_k w_0} \end{bmatrix} \right\|_\infty = \quad (42)$$

$$\left\| \begin{bmatrix} 0 & 0 \\ 0 & -\Phi_k^{-1} \Phi_0 H^{-k} \end{bmatrix} \begin{bmatrix} T_{z_1 w_1} \\ T_{u_1 w_1} \end{bmatrix} \right\|_\infty \le \| \Phi_k^{-1} \Phi_0 H^{-k} \|_\infty \left\| \begin{bmatrix} T_{z_1 w_1} \\ T_{u_1 w_1} \end{bmatrix} \right\|_\infty.$$

(B) The amplification of disturbances $w_j$ i) on the (j+1)-th vehicle is given by $$\left\| \begin{bmatrix} T_{z_{j+1} w_j} \\ T_{u_{j+1} w_j} \end{bmatrix} \right\|_\infty = \quad (43)$$

$$\left\| \begin{bmatrix} -H^{-1} & 0 \\ 0 & \Phi_j \Phi_{j+1}^{-1} \end{bmatrix} \begin{bmatrix} T_{z_j w_j} \\ T_{u_j w_j} \end{bmatrix} - \begin{bmatrix} 0 & 0 \\ 0 & \Phi_j \Phi_k^{-1} \end{bmatrix} \begin{bmatrix} T_{z_{j+1} w_{j+1}} \\ T_{u_{j+1} w_{j+1}} \end{bmatrix} \right\|_\infty \le \le$$

$$\left\| \begin{bmatrix} -H^{-1} & 0 \\ 0 & \Phi_j \Phi_{j+1}^{-1} \end{bmatrix} \right\|_\infty \left\| \begin{bmatrix} T_{z_j w_j} \\ T_{u_j w_j} \end{bmatrix} \right\|_\infty +$$

$$\left\| \begin{bmatrix} 0 & 0 \\ 0 & \Phi_j \Phi_{j+1}^{-1} \end{bmatrix} \right\|_\infty \left\| \begin{bmatrix} T_{z_{j+1} w_{j+1}} \\ T_{u_{j+1} w_{j+1}} \end{bmatrix} \right\|_\infty;$$

ii) on the k-th vehicle, with $k \ge j+2$, is given by $$\left\| \begin{bmatrix} T_{z_k w_j} \\ T_{u_k w_j} \end{bmatrix} \right\|_\infty = \left\| \begin{bmatrix} 0 & 0 \\ 0 & \Phi_j \Phi_k^{-1} H^{j+1-k} \end{bmatrix} \begin{bmatrix} T_{z_j w_j} \\ T_{u_j w_j} \end{bmatrix} - \quad (44)$$

$$\begin{bmatrix} 0 & 0 \\ 0 & \Phi_j \Phi_k^{-1} H^{j+1-k} \end{bmatrix} \begin{bmatrix} T_{z_{j+1} w_{j+1}} \\ T_{u_{j+1} w_{j+1}} \end{bmatrix} \right\|_\infty \le \le$$

$$\| \Phi_j \Phi_k^{-1} H^{j+1-k} \|_\infty \left\| \begin{bmatrix} T_{z_j w_j} \\ T_{u_j w_j} \end{bmatrix} \right\|_\infty + \| \Phi_j \Phi_k^{-1} H^{j+1-k} \|_\infty \left\| \begin{bmatrix} T_{z_{j+1} w_{j+1}} \\ T_{u_{j+1} w_{j+1}} \end{bmatrix} \right\|_\infty.$$

These statements follow by straightforward algebraic manipulations of the expressions of the closed-loop TFMs and by the sub-multiplicative property of the $H_\infty$ norm.

Consider constant inter-spacing policies (or, equivalently, by taking the expression of the constant time-headway $H(s)=1$), then the attenuation bounds discussed above do not depend on the number (k–j) of in-between vehicles. This is consistent with the traditional definitions for string stability of platoon formations. Furthermore, considering constant time-headway policies then the negative powers of the constant time-headway $H(s)$ having subunitary norm, will introduce additional attenuation, especially at high frequency via the strong effect of the roll-off.

A remarkable feature of the leader information controller is the fact that when dealing with merging traffic the only needed reconfiguration of the global scheme is at the follower of the merging vehicle, which must acknowledge the "new" unimodular factor $\Phi_k$ of the vehicle appearing in front of it. Such a maneuver can be looked at as a disturbance to the merging vehicle, to be quickly attenuated by the control scheme. Equally important, if the broadcasting of any vehicle in the platoon gets disrupted, then the global scheme can easily reconfigure, such that the non-broadcasting vehicle becomes the leader of a new platoon.

Compensation of Time-Delays Via Accurate Synchronization

This section looks at the factual scenario when there exists a time delay on each of the feedforward links $u_k$, with $1 \le k \le (n-1)$. In practice, these delays are caused by the physical limitations of the wireless communications system used for the implementation of the feedforward link, entailing a time delay $e^{-\theta s}$ (with θ typically around 20 ms) at the receiver of the broadcasted $u_k$ signal (with $1 \le k \le (n-1)$). Other wireless communications systems based on high frequency digital radio, such as Wi-Fi, ZigBee, Bluetooth and the like may have longer or shorter delays depending on the particular hardware and software implementation. In practice, the time delays will be time-varying. One embodiment of the synchronization mechanism described here is-able to cope with the time variance and heterogeneity of the communications induced time delays. This may be done by the synchronization operation which can simulate/implement identical, fixed, commensurate time delays. The identical time delays implemented by the synchronization operation may be chosen to be greater or equal with the worst case scenario of the communications induced time delays. This type of situation is represented in FIG. 9, by considering the T blocks to be equal to $e^{-\theta s}$, with $\theta \ne 0$. The synchronization mechanism can induce identical latencies for all vehicle which may be chose to be equal to the maximum of the latencies of all vehicles.

In the presence of such time delays in the implementation of the leader information controllers described above, the diagonal sparsity pattern of the resulted closed-loop TFM $T_{zw_0}$ is compromised as it becomes lower triangular and no longer satisfies criteria for some of the embodiments discussed above. This means that the resulted (wireless communications based) physical implementation of any controller will in fact not be a bona fide leader information controller. Furthermore, it can be shown that the effects of the communications delays drastically alter the closed loop performance as they necessarily lead to string instability.

The Effect of Communications Time Delays on the Control Performance

In order to make our point with illustrative simplicity let us consider (for this subsection only) the case of platoons with identical vehicles (i.e., $\Phi_k=1$, for all $1 \le k \le n$) and constant interspacing policies, (i.e., $H(s)=1$). Under these assumptions, the equation of the controller from FIG. 9, with $\Psi = e^{-\theta s}$, reads:

$$\begin{bmatrix} u_1 \\ u_2 \\ u_3 \\ \vdots \\ u_{n-1} \\ u_n \end{bmatrix} = \begin{bmatrix} O & O & O & \cdots & O & O \\ e^{-\theta s} & O & O & \cdots & O & O \\ O & e^{-\theta s} & O & \cdots & O & O \\ O & O & e^{-\theta s} & \cdots & O & O \\ \vdots & \vdots & \vdots & \ddots & \vdots & \vdots \\ O & O & O & \cdots & e^{-\theta s} & O \end{bmatrix} \star \begin{bmatrix} u_1 \\ u_2 \\ u_3 \\ M \\ u_{n-1} \\ u_n \end{bmatrix} + \quad (45)$$

$$\begin{bmatrix} K_1 & O & O & \cdots & O & O \\ O & K_2 & O & \cdots & O & O \\ O & O & K_3 & \cdots & O & O \\ O & O & O & \ddots & O & O \\ \vdots & \vdots & \vdots & \ddots & \vdots & O \\ O & O & O & \cdots & O & K_n \end{bmatrix} \star \begin{bmatrix} z_1 \\ z_2 \\ z_3 \\ \vdots \\ z_{n-1} \\ z_n \end{bmatrix}$$

or equivalently $$\begin{bmatrix} u_1 \\ u_2 \\ u_3 \\ \vdots \\ u_{n-1} \\ u_n \end{bmatrix} = \begin{bmatrix} 1 & O & O & \cdots & O & O \\ e^{-\theta s} & 1 & O & \cdots & O & O \\ e^{-2\theta s} & e^{-\theta s} & 1 & \cdots & O & O \\ e^{-3\theta s} & e^{-2\theta s} & e^{-\theta s} & \ddots & O & O \\ \vdots & \vdots & \vdots & \ddots & \vdots & \vdots \\ e^{(-n+1)\theta s} & e^{(-n+2)\theta s} & e^{(-n+3)\theta s} & \cdots & e^{-\theta s} & 1 \end{bmatrix} \quad (46)$$

$$\begin{bmatrix} K_1 & O & O & \cdots & O & O \\ O & K_2 & O & \cdots & O & O \\ O & O & K_3 & \cdots & O & O \\ O & O & O & \ddots & O & O \\ \vdots & \vdots & \vdots & \ddots & \vdots & O \\ O & O & O & \cdots & O & K_n \end{bmatrix} \star \begin{bmatrix} z_1 \\ z_2 \\ z_3 \\ \vdots \\ z_{n-1} \\ z_n \end{bmatrix}$$

As a result, any leader information controller, belongs to the following set S, defined as $$S \stackrel{def}{=} \{K \in \square(s)^{n \times n} | K = T^{-1}D\{D_{11}, D_{22}, \ldots D_{nn}\} \text{ with } D_{jj} \in \square(s), 1 \le j \le n\}. \quad (47)$$

The argument follows by straight forward algebraic manipulations starting from the right coprime factorization $K_Q = \tilde{X}_Q \tilde{Y}_Q^{-1}$ of any leader information controller. Clearly, the controller from (46) belongs to the set S in (47) (and is therefore a leader information controller) if and only if $\theta=0$ or, equivalently, in the absence of any communications delay. From (46) that the time-delays propagate "through the controller" downstream the platoon and the delays accumulate toward the end of the platoon, in a manner depending on the number of vehicles in the string (specifically n).

The basic fact known in control theory that the delay $e^{-\theta s}$ (on any of the feedforward channels $u_k$, with $1 \le k \le n$) cannot be efficiently compensated by a series connection with a linear filter on the feedforward path, such as a rational function approximation of the anticipative element $e^{\theta s}$, that would "cancel out" the effect of the delay.

The Delays Compensation Mechanism Using Synchronization

Figure 12:
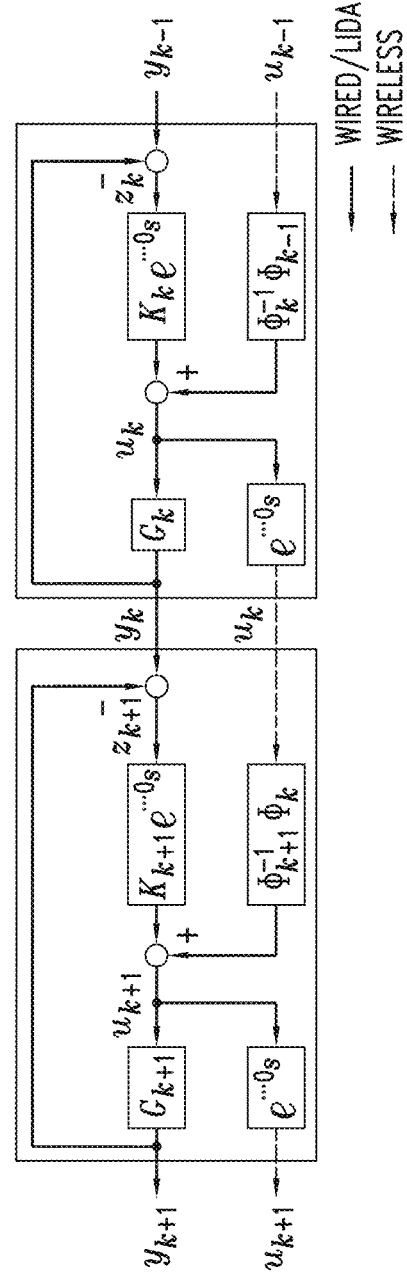
FIG. 12 is a block diagram illustrating an example of a leader information control with time delays compensation that can be used in some embodiments of the present technology.

This subsection shows how the communications induced delays can be compensated at the expense of a negligible loss in performance. By placing a delay of exactly θ seconds on each of the sensor measurements $z_k$. This delay appears in FIG. 12 as an $e^{-\theta s}$ factor in the transfer function $K_{k+1}$, for any $1 \le k \le n-1$.

Having a delay $e^{-\theta s}$ on both $u_k$ and $z_{k+1}$ is equivalent with having an $e^{-\theta s}$ delay in the model of the (k+1)-th vehicle $G_{k+1}$, for any $1 \le k \le n-1$. The argument for this fact is the following controller equation for the equivalent scheme of FIG. 13:

$$\begin{bmatrix} u_1 \\ e^{-\theta s} \star u_2 \\ e^{-\theta s} \star u_3 \\ \vdots \\ e^{-\theta s} \star u_{n-1} \\ e^{-\theta s} \star u_n \end{bmatrix} = \quad (48)$$

$$H^{-1} \begin{bmatrix} 0 & 0 & 0 & \cdots & 0 & 0 \\ \Phi_2^{-1}\Phi_1 e^{-\theta s} & 0 & 0 & \cdots & 0 & 0 \\ 0 & \Phi_3^{-1}\Phi_2 e^{-\theta s} & 0 & \cdots & 0 & 0 \\ 0 & 0 & \Phi_4^{-1}\Phi_3 e^{-\theta s} & \cdots & 0 & 0 \\ \vdots & \vdots & \vdots & \ddots & \vdots & \vdots \\ 0 & 0 & 0 & \cdots & \Phi_n^{-1}\Phi_{n-1} e^{-\theta s} & 0 \end{bmatrix} \star$$

$$\begin{bmatrix} u_1 \\ u_2 \\ u_3 \\ \vdots \\ u_{n-1} \\ u_n \end{bmatrix} + +$$

$$H^{-1} \begin{bmatrix} K_1 e^{-\theta s} & 0 & 0 & \cdots & 0 & 0 \\ 0 & K_2 e^{-\theta s} & 0 & \cdots & 0 & 0 \\ 0 & 0 & K_3 e^{-\theta s} & \cdots & 0 & 0 \\ 0 & 0 & 0 & \ddots & 0 & 0 \\ \vdots & \vdots & \vdots & \ddots & \vdots & 0 \\ 0 & 0 & 0 & \cdots & 0 & K_n e^{-\theta s} \end{bmatrix} \star \begin{bmatrix} z_1 \\ z_2 \\ z_3 \\ \vdots \\ z_{n-1} \\ z_n \end{bmatrix}$$

Figure 13:
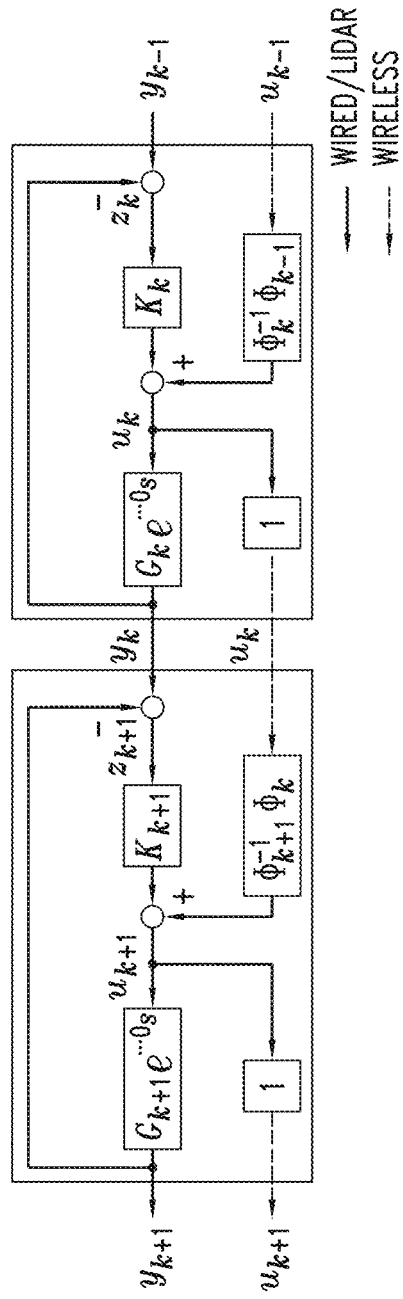
FIG. 13 is a block diagram illustrating an example of a leader information control equivalent scheme where the time delays have been included in the dynamical model of the plant, that can be used in various embodiments of the present technology.

Note that (48) results directly from the equation for the leader information controller described above by multiplying both sides to the left with the n×n diagonal TFM $D\{1, e^{-\theta s}, e^{-\theta s}, \ldots e^{-\theta s}\}$. It is important to observe that the controller given in (48) acts on the $e^{-\theta s}$ delayed version of the platoon's plant that the controller given in (25) acts on. For the purposes of designing the sub-controller $K_{k+1}$, the $e^{-\theta s}$ time delay will be considered to be part of the $G_{k+1}$ plant model in various embodiments. The LTI controller synthesis can be then performed by taking a conveniently chosen Pade rational approximation of $e^{-\theta s}$ to be included in the expression of $G_\wp$. The LTI controller synthesis may be performed by taking a conveniently Pade approximation of the vehicle's latency time delay or of the maximum of the latencies of all vehicles in the platoon, to be included in the expression of $G_\wp$. It is a well-known fact that such an approximation will introduce additional non-minimum phase zeros in $G_\wp$ and consequently some loss in performance. However, and this is important, the resulted controllers of FIG. 13 are leader information controllers and will therefore feature all the structural properties discussed above.

Recent CACC Design Methods

Recent methods on controller synthesis for string stability of vehicle platoons also dubbed Cooperative Adaptive Cruise Control systems, also use the wirelessly transmitted control signal of the predecessor in the string. However, the aforementioned methods attempt to compensate for the wireless communications induced delays by placing a LTI filter on the feedforward path such as to minimize a certain $H_\infty$ criterion. It is well known in control engineering that no causal LTI filter placed in series with the delay on the feedforward path can cancel out the effects of the time delay. As a consequence of this, it is acknowledged in recent methods for Fault Tolerance of Cooperative Vehicle Platoons Subject to Communication Delay, that such attempts to compensate the communications induced delay (with a LTI filter on the feedforward path and an $H_\infty$ criterion) always lead to string instability for distance based headways (constant interspacing policies) or in the absence of sufficiently large time headways. In contrast, the methods proposed here in some embodiments preserve string stability even for distance headways (constant interspacing policies) by means of the synchronization mechanism described before (instead of a LTI filter on the feedforward path).

Numerical Example

This section presents a numerical MATLAB simulation for the platoon motion with n=6 vehicles, having the transfer function $$G_k(s) = \frac{s + \sigma_k}{m_k s^2 (\rho_k s + 1)} e^{-(\tau+\theta)s}, k = 1, 2, \ldots 6. \quad (50)$$

where τ=0.1 sec. is the electro-hydraulic break/throttle actuator delay and θ=0.03 sec. is the wireless communications delay. For the k-th vehicle, the mass $m_k$, the actuator time constant $\rho_k$ and the stable zero $\sigma_k > 0$ are given in Table II, next.

TABLE II

NUMERICAL PARAMETERS FOR THE VEHICLES

| k | 1 | 2 | 3 | 4 | 5 | 6 |
|---|---|---|---|---|---|---|
| $m_k$ [kg] | 8 | 4 | 1 | 3 | 2 | 7 |
| $\rho_k$ [s] | 0.1 | 0.2 | 0.05 | 0.1 | 0.1 | 0.3 |
| $\sigma_k$ | 1 | 2 | 3 | 4 | 5 | 6 |

Figure 14:
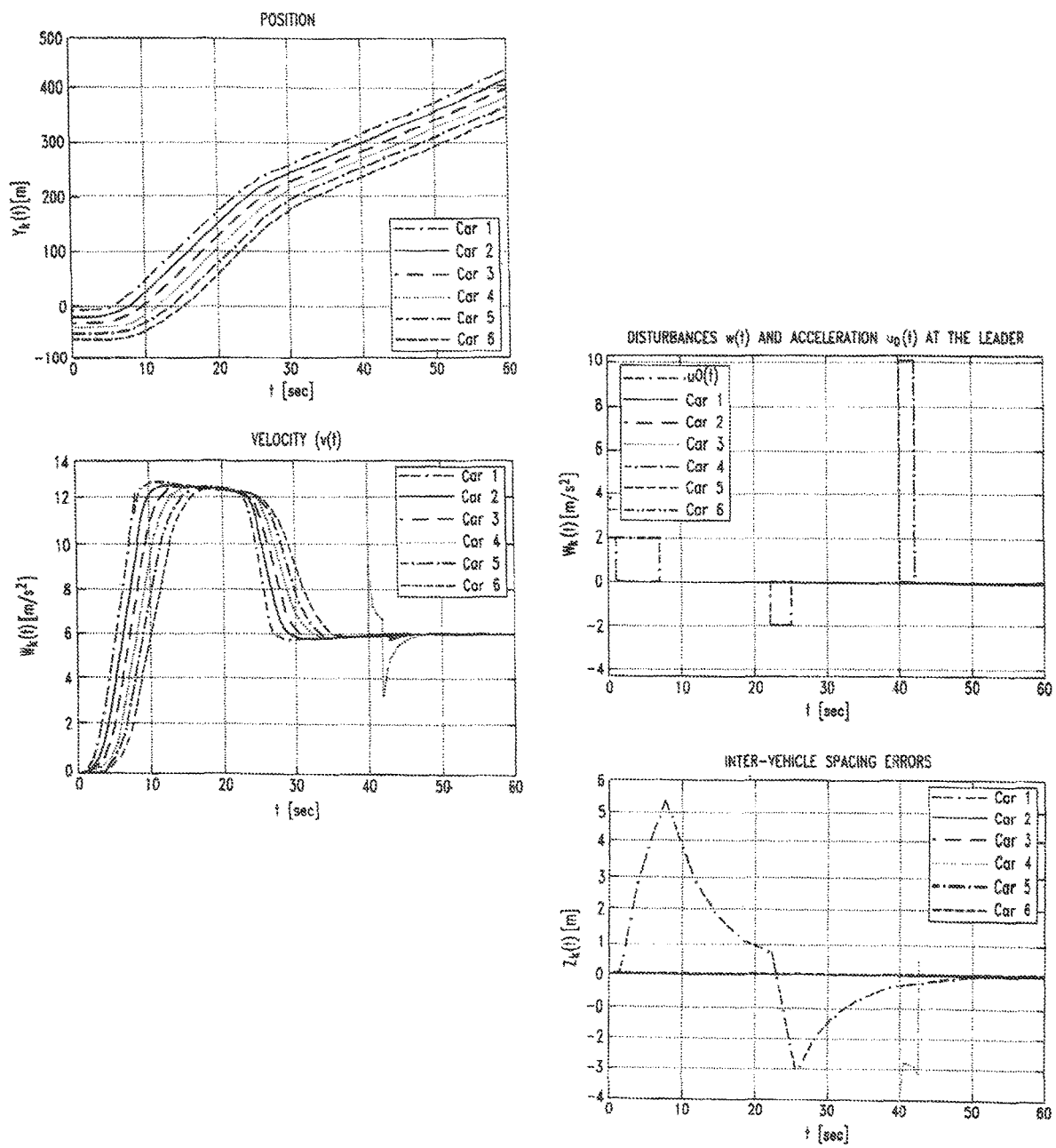
FIG. 14 illustrates simulation results for distributed leader information control for platooning.

The leader information controllers for each vehicle were designed according to various embodiments described above, by taking a Pade approximation for the time delays from (50). The parameters $Q_{jj}$, j=1, . . . , 6 were obtained by minimizing the practical $H_\infty$ criterion given in (40). The simulation results are given in FIG. 14. The simulation results illustrated for distributed leader information control for platooning in FIG. 14 include (from top left): disturbances for vehicle k/acceleration at the leader; Inter-vehicle spacing errors z(t); Position y(t) (absolute value); and Velocity v(t).

The leader's control signal $u_0(t)$ (generated by the human driver in the leader vehicle) is given in the top left plot, along with a rectangular pulse disturbance $w_4(t)$ at the 4-th vehicle. It can be observed that the $u_0$ causes nonzero inter-vehicle spacing error only at $z_1$, specifically the car behind the leader (vehicle with index 1) and not at all for the vehicles 2 and behind. The disturbance at the 4-th vehicle affects, the inter-spacing errors $z_4$ and $z_5$ only (at vehicle 4 and its follower, vehicle 5, respectively) and not at all for vehicle 6.

Supplemental Remarks

It should be clear for all those skilled in the art of control engineering that the synchronization based control mechanism described before allows implementations for LTI systems with discrete time. Such implementations may be realized using digital to analog and/or analog to digital converters, zero order hold methods or similar or equivalent methods and represent different embodiments of the continuous time systems described before. Specifically, the doubly coprime factorizations (2) should be performed with respect to the stability domain of LTI discrete time which is the unit circle, the Laplace transform $e^{-\theta s}$ of the continuous time delay has the discrete time correspondent given by the Z transform $z^{-m}$. The $H_2$ and $H_\infty$ operator norms are well defined for LTI discrete time systems and the corresponding discrete time $H_2/H_\infty$ model matching problems (similar to the continuous time formulation from (40)) can be solved using existing methods.

It should be clear for all those skilled in the art that the $H_\infty$ model matching problem (40) can be adapted as to comprise different types of cost functionals that may include supplemental closed loop transfer functions. The cost functionals may also include mixed $H_2/H_\infty$ cost functionals.

Peak-to-Peak Disturbance Attenuation—Homogeneous Strings

Denote with $\square^{m \times n}$, the set of all m rows times n columns matrices with real entries. The following LTI discrete time, state space equations can be used to describe the dynamics of the k-th vehicle relating the controls $u_k[t]$ of the vehicle to its position $y_k[t]$ on the roadway, where $0 \leq k \leq n$, and the index "0" reserved for the leading vehicle (first one in the string)

$$x_k[t+1]=Ax_k[t]+B(u_k[t]+w_k[t]); x_k[0]=x_k^0 \in \square^l \quad (51a)$$

$$y_k[t]=Cx_k[t] \quad (51b)$$

where $A \in \square^{l \times l}$, $B \in \square^{l \times 1}$, $C \in \square^{1 \times l}$, $w_k$ are the unknown bounded disturbances. The LTI discrete time input-output equation for the k-th vehicle is given by $$y_k = G_\varphi(z) \star (u_k + w_k) \quad (52)$$

where $\star$ is the discrete time linear convolution. It is also assumed all vehicles have identical dynamical models given by the transfer function $G_\varphi(z)$. The actuating time delays, the communications induced time delays and the time delays produced by the synchronization mechanism for each vehicle may be included in the dynamical model of $G_\varphi(z)$.

Using the following notation for the block-diagonal matrices: $A \stackrel{def}{=} D\{A, A, \ldots A\} \in \square^{nl \times nl}$, $B \stackrel{def}{=} D\{B, B \ldots B\} \in \square^{nl \times n}$ and $C \stackrel{def}{=} D\{C, C \ldots C\} \in \square^{n \times nl}$ and let $\Gamma_1 \in \square^{n \times n}$ be the following string formation "coupling" matrix, with $V_1$ representing the first vector of the Euclidian basis in $\square^n$ $$\Gamma_1 \stackrel{def}{=} \begin{bmatrix} -1 & 0 & \cdots & 0 & 0 \\ 1 & -1 & \cdots & 0 & 0 \\ \vdots & \ddots & \ddots & \vdots & \vdots \\ 0 & 0 & \ddots & -1 & 0 \\ 0 & 0 & \cdots & 1 & -1 \end{bmatrix}, V_1 \stackrel{def}{=} \begin{bmatrix} 1 \\ 0 \\ \vdots \\ 0 \\ 0 \end{bmatrix}. \quad (53)$$

Next the vectors of the relative states $\Delta x$ are defined; the interspacing errors z (with respect to the predecessor in the string) and the vector of the relative controls $\Delta u$, respectively $$\begin{bmatrix} \Delta x_1 \\ \Delta x_2 \\ \vdots \\ \Delta x_n \end{bmatrix} \stackrel{def}{=} \begin{bmatrix} (x_0 - x_1) \\ (x_1 - x_2) \\ \vdots \\ (x_{N-1} - x_N) \end{bmatrix}; \begin{bmatrix} z_1 \\ z_2 \\ \vdots \\ z_N \end{bmatrix} \stackrel{def}{=} \begin{bmatrix} (y_0 - y_1) \\ (y_1 - y_2) \\ \vdots \\ (y_{N-1} - y_N) \end{bmatrix}; \quad (54)$$

$$\Delta u \stackrel{def}{=} \begin{bmatrix} -u_1 \\ (u_1 - u_2) \\ \vdots \\ (u_{N-1} - u_N) \end{bmatrix}.$$

The time evolution of the regulated measures are of interest, which in the formation control problem is the interspacing error vector z, therefore by subtracting the equation (51) for the k-th agent from the equation of the (k−1)-th agent in order to get the following state equations of the relative states $$\Delta x_k[t+1]=A\Delta x_k[t]+B(u_{k-1}[t]-u_k[t])+B(w_{k-1}[t]-w_k[t]) \quad (55a)$$

$$z_k[t]=C\Delta x_k[t]+Ev[t] \quad (55b)$$

where v is the bounded measurement noise of the interspacing distance. Writing (55) in an aggregated form, for the entire formation using the notation from (54) yields $$\Delta x[t+1] = A\Delta x[t] + B\Delta u[t] + [BV_1 \ B\Gamma_1] \begin{bmatrix} (w_0[t] + u_0[t]) \\ w[t] \end{bmatrix} \quad (56a)$$

$$z[t]=C\Delta x[t]+Ev[t] \quad (56b)$$

where in (56) the control $u_0$ of the leading vehicle is considered to be included in the disturbance $w_0$, since they represent reference signals for the entire string. Controllers of the form $$\Delta u = -K_d z. \quad (57)$$

can be constructed. A particular structure of the controller (57) that achieves an optimal disturbance rejection level $\mu^*$ in presence of bounded disturbances and bounded measurement noise, namely when $\|w_0[t]\|_\infty \leq 1, \|w[t]\|_\infty \leq 1$ and $\|v[t]\|_\infty \leq 1$ is desired. In other words, for zero error initial conditions $z[0]=0$ the closed-loop system errors must satisfy:

$$\|z[t]\| \leq \mu^*, \forall t. \quad (58)$$

The resolution of the following convex (linear) programming problem leads-to the optimal rejection level and to the distributed linear control law:

$$\mu^* = \min_{K_d, S, \mu} \mu \quad (59)$$

$$\text{subject to} \begin{cases} \mu > 0, S \geq 0 \\ SC = C(A - BK_d), \\ -\mu 1 \leq S1 + CB\Gamma \overline{w}^j + CBV_1 \overline{w}_0^j + E\overline{v}^k \leq \mu 1 \end{cases}$$

The matrix S is square and n times n, the inequality $S \geq 0$ is interpreted element-wise and the vectors $\overline{w}^i$, $\overline{w}_0^j$ and $\overline{v}^k$ are the extreme realizations of the respective disturbances noises while 1 is the constant vector with all entries equal to 1. The optimization problem is linear with respect to the gain matrix $K_d$ and the rejection factor $\mu$. Efficient LP solvers can be used for large instances of this optimization-based control design. In the present formulation, the distributed linear feedback ensures an optimal rejection by including the structural constraints at the design stage.

The linear program in (59) whose size depends on the number of vehicles in the string can be solved onboard each vehicle in order to produce the gain $K_d$. The linear program in (59) may be decomposed in its block diagonal components and solved in a distributed manner onboard each vehicle in order to produce the local gain. The regularization information for the entire string for the level of disturbances and noises may be made available to each vehicle through communications protocols. It should be clear to all those skilled in the art that various equivalent forms of (59), such as to attain optimal or suboptimal performance can be formulated without altering its structure and such as to incorporate certain rank conditions on the state space realization matrices.

Heterogeneous Platoons with Time Headways

Let us assume that the LTI discrete time input-output equation for the k-th vehicle strictly proper transfer function from its control signal $u_k[t]$ to its position on the road $y_k[t]$ is given by $$y_k \Phi_k(z) G_\wp(z) \star (u_k + w_k) \tag{60}$$

$$\begin{bmatrix} -H \star u_1 \\ -H \star u_2 + \Phi_2^{-1}\Phi_1 \star u_1 \\ -H \star u_3 + \Phi_3^{-1}\Phi_2 \star u_2 \\ \vdots \\ -H \star u_{n-1} + \Phi_{n-1}^{-1}\Phi_{n-2} \star u_{n-2} \\ -H \star u_n + \Phi_n^{-1}\Phi_{n-1} \star u_{n-1} \end{bmatrix} = -\begin{bmatrix} K_1 & O & O & \cdots & O & O \\ O & K_2 & O & \cdots & O & O \\ O & O & K_3 & \cdots & O & O \\ O & O & O & \ddots & O & O \\ \vdots & \vdots & \vdots & \ddots & \vdots & O \\ O & O & O & \cdots & O & K_n \end{bmatrix} \star \begin{bmatrix} z_1 \\ z_2 \\ z_3 \\ \vdots \\ z_{n-1} \\ z_n \end{bmatrix} \tag{68}$$

where $\star$ is the discrete time linear convolution. The actuating time delays, the communications induced time delays and the time delays produced by the synchronization mechanism for each vehicle may be included in the dynamical model.

Figure 10:
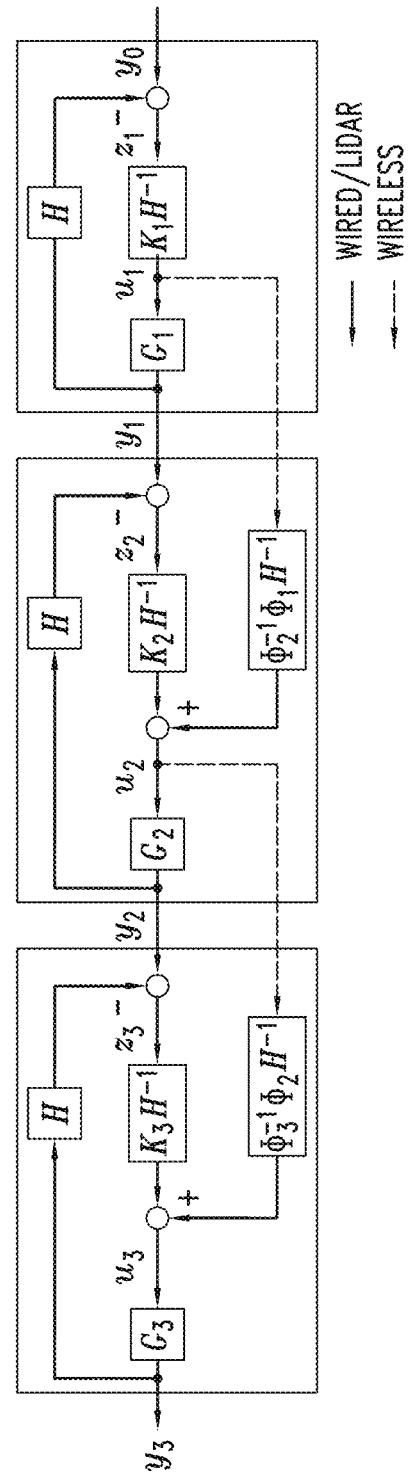
FIG. 10 is a block diagram illustrating an example of an implementation with the constant time-headway H for the first three vehicles in the string that can be used in various embodiments of the present technology.
Figure 11:
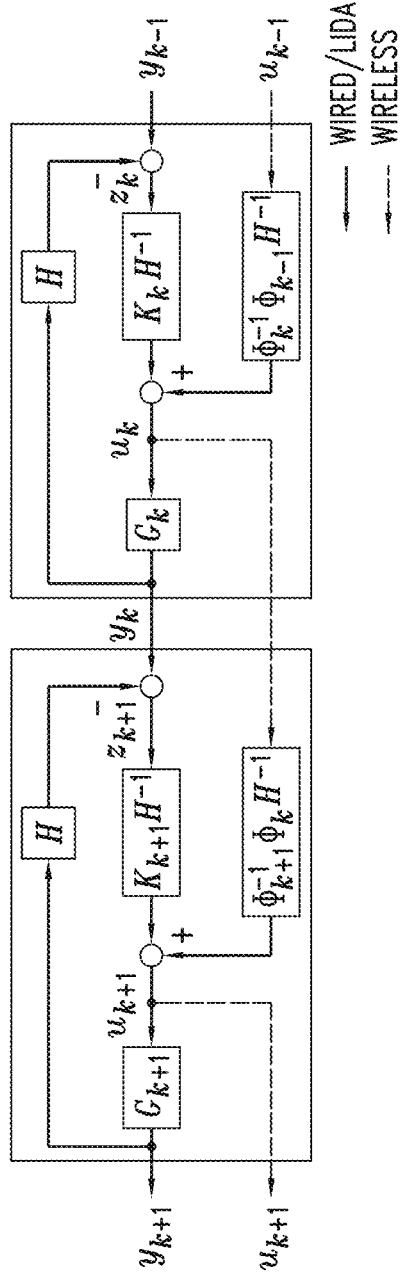
FIG. 11 is a block diagram illustrating an example of an implementation with the constant time-headway H that can be used in one or more embodiments of the present technology.

Consider similarly to (11) the discrete time inter-vehicle spacing errors $z_k \overset{def}{=} y_{k-1} - H \star y_k$ for the k-th vehicle $$z_k[t] \overset{def}{=} y_{k-1}[t] - (y_k[t] + h(y_k[t] - y_k[t-1])), \text{ for } 1 \leq k \leq n. \tag{61}$$

or equivalently $$z_k = G_{k-1} \star (u_{k-1} + w_{k-1}) - H G_k \star (u_k + w_k), 1 \leq k \leq n, \tag{62}$$

where the Z transform of the discrete time headway H(z) is defined as $$H(z) \overset{def}{=} 1 + h(1 - z^{-1}), h > 0 \tag{63}$$

or equivalently $$H(z) = \frac{(1+h)z - h}{z}, h > 0 \tag{64}$$

having one pole at z=0 and one Smith zero at z=h/(1+h). Since $G_{k-1} = G_\wp \Phi_{k-1}$ and $G_k = G_\wp \Phi_k$, (62) can be rewritten as $$z_k = G_\wp \Phi_k \star (\Phi_k^{-1} \Phi_{k-1} \star u_{k-1} - H \star u_k) + G_\wp \Phi_{k-1} \star w_{k-1} - H G_\wp \Phi_k \star w_k \tag{65}$$

and considering control laws of the type $$\Phi_k^{-1} \Phi_{k-1} \star u_{k-1} - H \star u_k = -K_k \star z_k \text{ with } 2 \leq k \leq n, \tag{66}$$

resulting therefore in the control architectures from FIG. 10 and FIG. 11. The discrete time equivalent of equation (16) of the platoon's plant reads:

$$\begin{bmatrix} z_1 \\ z_2 \\ z_3 \\ \vdots \\ z_n \end{bmatrix} = \begin{bmatrix} 1 \\ O \\ O \\ \vdots \\ O \end{bmatrix} G_\wp \Phi_0 \star (u_0 + w_0) + \tag{67}$$

$$\begin{bmatrix} -HG_\wp\Phi_1 & O & O & \cdots & O \\ G_\wp\Phi_1 & -HG_\wp\Phi_2 & O & \cdots & O \\ O & G_\wp\Phi_2 & -HG_\wp\Phi_3 & \cdots & O \\ \vdots & \vdots & \vdots & & \vdots \\ O & O & O & \cdots & -HG_\wp\Phi_n \end{bmatrix} \star \begin{bmatrix} (u_1+w_1) \\ (u_2+w_2) \\ (u_3+w_3) \\ \vdots \\ (u_n+w_n) \end{bmatrix}.$$

In view of (66) the aggregated controller equations read:

Defining the relative controls vector $\Delta u[t]$ to be given by $$\Delta u[t] \overset{def}{=} \begin{bmatrix} -H \star u_1[t] \\ -H \star u_2[t] + \Phi_2^{-1}\Phi_1 \star u_1[t] \\ -H \star u_3[t] + \Phi_3^{-1}\Phi_2 \star u_2[t] \\ \vdots \\ -H \star u_{n-1}[t] + \Phi_{n-1}^{-1}\Phi_{n-2} \star u_{n-2}[t] \\ H \star u_n[t] - \Phi_n^{-1}\Phi_{n-1} \star u_{n-1}[t] \end{bmatrix} \tag{69}$$

In view of (68), (67) can be rewritten as the following completely decoupled system $$\begin{bmatrix} z_1 \\ z_2 \\ z_3 \\ \vdots \\ z_n \end{bmatrix} = \begin{bmatrix} G_\wp\Phi_1 & O & O & \cdots & O \\ O & G_\wp\Phi_2 & O & \cdots & O \\ O & O & G_\wp\Phi_3 & \cdots & O \\ \vdots & \vdots & \vdots & & \vdots \\ O & O & O & \cdots & G_\wp\Phi_N \end{bmatrix} \star \tag{70}$$

$$\begin{bmatrix} -H \star u_1 \\ -H \star u_2 + \Phi_2^{-1}\Phi_1 \star u_1 \\ -H \star u_3 + \Phi_3^{-1}\Phi_2 \star u_2 \\ \vdots \\ -H \star u_{n-1} + \Phi_{n-1}^{-1}\Phi_{n-2} \star u_{n-2} \\ -H \star u_n + \Phi_n^{-1}\Phi_{n-1} \star u_{n-1} \end{bmatrix} + \begin{bmatrix} 1 \\ O \\ O \\ \vdots \\ O \end{bmatrix} G_\wp \Phi_0 \star (u_0 + w_0) +$$

$$\begin{bmatrix} -HG_\wp\Phi_1 & O & O & \cdots & O \\ G_\wp\Phi_1 & -HG_\wp\Phi_2 & O & \cdots & O \\ O & G_\wp\Phi_2 & -HG_\wp\Phi_3 & \cdots & O \\ \vdots & \vdots & \vdots & & \vdots \\ O & O & O & \cdots & -HG_\wp\Phi_n \end{bmatrix} \star \begin{bmatrix} w_1 \\ w_2 \\ w_3 \\ \vdots \\ w_n \end{bmatrix}.$$

The transformation for the relative controls vector is given by:

$$\begin{bmatrix} -H \star u_1 \\ -H \star u_2 + \Phi_2^{-1}\Phi_1 \star u_1 \\ -H \star u_3 + \Phi_3^{-1}\Phi_2 \star u_2 \\ \vdots \\ -H \star u_{n-1} + \Phi_{n-1}^{-1}\Phi_{n-2} \star u_{n-2} \\ -H \star u_n + \Phi_n^{-1}\Phi_{n-1} \star u_{n-1} \end{bmatrix} = \begin{bmatrix} -H & O & O & \cdots & O & O \\ \Phi_2^{-1}\Phi_1 & -H & O & \cdots & O & O \\ O & \Phi_3^{-1}\Phi_2 & -H & \cdots & O & O \\ \vdots & \vdots & \vdots & & \vdots & \vdots \\ O & O & O & \cdots & -H & O \\ O & O & O & \cdots & \Phi_n^{-1}\Phi_{n-1} & H \end{bmatrix} \star \begin{bmatrix} u_1 \\ u_2 \\ u_3 \\ \vdots \\ u_{n-1} \\ u_n \end{bmatrix}$$

where $\Gamma_2(z)$ denotes the following transfer function matrix $$\Gamma_2(z) \stackrel{def}{=} \begin{bmatrix} -H & O & O & \cdots & O & O & O \\ \Phi_2^{-1}\Phi_1 & -H & O & \cdots & O & O & O \\ O & \Phi_3^{-1}\Phi_2 & -H & \cdots & O & O & O \\ \vdots & \vdots & \vdots & & \vdots & \vdots & \vdots \\ O & O & O & \cdots & -H & O & O \\ O & O & O & \cdots & \Phi_{n-1}^{-1}\Phi_{n-2} & -H & O \\ O & O & O & \cdots & O & \Phi_n^{-1}\Phi_{n-1} & -H \end{bmatrix} \quad (71)$$

while noting that $$\Gamma_2(z)^{-1} = -\begin{bmatrix} H^{-1} & O & O & \cdots & O & O & O \\ H^{-2}\Phi_2^{-1}\Phi_1 & H^{-1} & O & \cdots & O & O & O \\ H^{-3}\Phi_3^{-1}\Phi_1 & H^{-2}\Phi_3^{-1}\Phi_2 & H^{-1} & \cdots & O & O & O \\ \vdots & \vdots & \vdots & & \vdots & \vdots & \vdots \\ H^{-n+2}\Phi_{n-2}^{-1}\Phi_1 & H^{-n+3}\Phi_{n-2}^{-1}\Phi_2 & H^{-n+4}\Phi_{n-2}^{-1}\Phi_3 & \cdots & H^{-1} & O & O \\ H^{-n+1}\Phi_{n-1}^{-1}\Phi_1 & H^{-n+2}\Phi_{n-1}^{-1}\Phi_2 & H^{-n+3}\Phi_{n-1}^{-1}\Phi_3 & \cdots & H^{-2}\Phi_{n-1}^{-1}\Phi_{n-2} & H^{-1} & O \\ H^{-n}\Phi_n^{-1}\Phi_1 & H^{-n+1}\Phi_n^{-1}\Phi_2 & H^{-n+2}\Phi_n^{-1}\Phi_3 & \cdots & H^{-3}\Phi_n^{-1}\Phi_{n-2} & H^{-2}\Phi_n^{-1}\Phi_{n-1} & H^{-1} \end{bmatrix}$$

It also holds that for the platoon's plant $$G \stackrel{def}{=} \begin{bmatrix} -HG_\wp\Phi_1 & O & O & \cdots & O \\ G_\wp\Phi_1 & -HG_\wp\Phi_2 & O & \cdots & O \\ O & G_\wp\Phi_2 & -HG_\wp\Phi_3 & \cdots & O \\ \vdots & \vdots & \vdots & & \vdots \\ O & O & O & \cdots & -HG_\wp\Phi_n \end{bmatrix} = = \quad (72)$$

$$\begin{bmatrix} G_\wp\Phi_1 & O & O & \cdots & O \\ O & G_\wp\Phi_2 & O & \cdots & O \\ O & O & G_\wp\Phi_3 & \cdots & O \\ \vdots & \vdots & \vdots & & \vdots \\ O & O & O & \cdots & G_\wp\Phi_n \end{bmatrix} \quad (73)$$

$$\begin{bmatrix} -H & O & O & \cdots & O & O & O \\ \Phi_2^{-1}\Phi_1 & -H & O & \cdots & O & O & O \\ O & \Phi_3^{-1}\Phi_2 & -H & \cdots & O & O & O \\ \vdots & \vdots & \vdots & & \vdots & \vdots & \vdots \\ O & O & O & \cdots & -H & O & O \\ O & O & O & \cdots & \Phi_{n-1}^{-1}\Phi_{n-2} & -H & O \\ O & O & O & \cdots & O & \Phi_n^{-1}\Phi_{n-1} & -H \end{bmatrix}$$

The equation (70) becomes $$\begin{bmatrix} z_1 \\ z_2 \\ z_3 \\ \vdots \\ z_n \end{bmatrix} = \begin{bmatrix} G_\wp \Phi_1 & O & O & \cdots & O \\ O & G_\wp \Phi_2 & O & \cdots & O \\ O & O & G_\wp \Phi_3 & \cdots & O \\ \vdots & \vdots & \vdots & & \vdots \\ O & O & O & \cdots & G_\wp \Phi_N \end{bmatrix} \star \Delta u[t] + \begin{bmatrix} 1 \\ O \\ O \\ \vdots \\ O \end{bmatrix} \quad (74)$$

$$G_\wp \Phi_0 \star (u_0 + w_0) + \begin{bmatrix} G_\wp \Phi_1 & O & O & \cdots & O \\ O & G_\wp \Phi_2 & O & \cdots & O \\ O & O & G_\wp \Phi_3 & \cdots & O \\ \vdots & \vdots & \vdots & & \vdots \\ O & O & O & \cdots & G_\wp \Phi_n \end{bmatrix} \Gamma_2(z) \star \begin{bmatrix} w_1 \\ w_2 \\ w_3 \\ \vdots \\ w_n \end{bmatrix}.$$

Let (A,B,C) be a state space realization of the strictly proper diagonal transfer function matrix $$\begin{bmatrix} G_\wp \Phi_1 & O & O & \cdots & O \\ O & G_\wp \Phi_2 & O & \cdots & O \\ O & O & G_\wp \Phi_3 & \cdots & O \\ \vdots & \vdots & \vdots & & \vdots \\ O & O & O & \cdots & G_\wp \Phi_n \end{bmatrix}$$

with each of the matrices (A,B,C) being block-diagonal. The state equations for the entire string read $$\Delta x[t+1] = \quad (75a)$$

$$A\Delta x[t] + B\Delta u[t] + B[\, V_1 \Phi_1^{-1}(z)\Phi_0(z) \quad \Gamma_2(z)\,] * \begin{bmatrix} (u_0[t] + w_0[t]) \\ w[t] \end{bmatrix}$$

$$z[t] = C\Delta x[t] + Ev[t] \quad (75b)$$

where in (75) the control $u_0[t]$ of the leading vehicle is considered to be included in the disturbance $w_0[t]$, since they represent reference signals for the entire string, while v is the bounded measurement noise for the inter-spacing distances. Given the extreme realizations of the $(u_0[t]+w_0[t])$,w(t) disturbances, the extreme realizations of the filtered disturbances $$[\, V_1(\Phi_1^{-1}\Phi_0)(z) \quad \Gamma_2(z)\,] * \begin{bmatrix} (u_0[t] + w_0[t]) \\ w[t] \end{bmatrix} \quad (76)$$

may be computed using existing methods from theory and computation of disturbance invariant sets for discrete time linear systems. Controllers of the form $$\Delta u = -K_d z. \quad (77)$$

are desired. A particular structure of the controller (77) that achieves an optimal disturbance rejection level $\mu^*$ in presence of bounded disturbances and bounded measurement noise, namely when $\|w_0[t]\|_\infty \leq 1, \|w[t]\|_\infty \leq 1$ and $\|v[t]\|_\infty \leq 1$. In other words, for zero error initial conditions $z[0]=0$ the closed-loop system errors must satisfy:

$$\|z[t]\| \leftarrow \mu^*, \forall t. \quad (78)$$

The extreme realizations of the filtered disturbances may be used to write the following linear program for the synthesis of the distributed controller. The resolution of the following convex (linear) programming problem leads to the optimal rejection level and to the distributed linear control law:

$$\mu^* = \min_{K_d S, \mu} \mu \quad (79)$$

$$\text{subject to } \begin{cases} \mu > 0, S \geq 0 \\ SC = C(A - BK_d), \\ -\mu 1 \leq S1 + CB\overline{w}^j + CBV_1\overline{w}_0^j + E\overline{v}^k \leq \mu 1 \end{cases}$$

The matrix S is square and n by n and _the inequality S≤0 is interpreted element-wise and the vectors $\overline{w}^i$, $\overline{w}_0^j$ and $\overline{v}^k$ are now the extreme realizations of the filtered disturbances (76) and of the measurement noise respectively, while 1 is the constant vector with all entries equal to 1. The optimization problem is linear with respect to the gain matrix $K_d$ and the rejection factor $\mu$. Efficient LP solvers can be used for large instances of this optimization-based control design. In the present formulation, the distributed linear feedback ensures an optimal rejection by including the structural constraints at the design stage.

Once the optimal gain $K_d$ is computed by solving (79) onboard each vehicle, the control signal for the k-th vehicle can be retrieved from (66) by the following LTI filtration $$u_k[t] = H^{-1}\Phi_k^{-1}\Phi_{k-1} \star u_{k-1}[t] + H^{-1}K_k \star z_k[t] \quad (80)$$

The linear program in (79) whose size depends on the number of vehicles in the string can be solved onboard each vehicle in order to produce the gain $K_d$. The linear program in (79) may be decomposed in its block diagonal components and solved in a distributed manner onboard each vehicle in order to produce local gain. The regularization information for the entire string for the level of disturbances and noises may be made available to each vehicle through communications protocols. It should be clear to all those skilled in the art that various equivalent forms of (79), such as to attain optimal or suboptimal performance can be formulated without altering its structure and such as to incorporate certain rank conditions on the state space realization matrices. The linear program (79) may be solved each time the composition of the formation changes due to merging/exiting of vehicles Alternative Method For each agent consider the following dynamics, relating the controls $u_k(t)$ of the k-th vehicle to its position $y_k(t)$ on the roadway $$\dot{y}_k = v_k, \dot{v}_k = f(v_k) + u_k, \tag{81}$$

where $\dot{y}_k$ is the differential with respect to the time argument of $y_k(\bullet)$ and $v_k(t)$ is the instantaneous speed of the k-th agent. We define $$z_k \stackrel{def}{=} y_k - y_{k-1}, z_k^v \stackrel{def}{=} v_k - v_{k-1}, \tag{82}$$

with $1 \le k \le N$ to be the interspacing and relative velocity error signals, respectively (with respect to the predecessor in the string). It follows that $\dot{z}_k = z_k^v$ and so the relative velocity error evolution for the k-th agent is given by $$\dot{z}_k^v = f(v_k) - f(v_{k-1}) + u_k - u_{k-1}. \tag{83}$$

The current embodiment synchronizes the trajectory of all agents with the one of the first vehicle in the string while avoiding collision and regulating the relative speed errors $z_k^v$ (velocity matching).

For the nonlinear control policies we look at the Artificial Potential Functions (APF) which are commonplace in nonlinear agents control. We write the following control law for the k-th vehicle (we present the delay-free situation first and account for the transmission delays in the sequel)

$$u_k = u_{k-1} - \beta_k(v_k - v_{k-1}) - \nabla_{y_k} V_{k,k-1}(\Box y_k - y_{k-1}\Box_\sigma) \tag{84}$$

where $V_{k,k-1}(\bullet)$ is the Artificial Potential Function and $\beta_k$ is a proportional gain, to be designed for supplemental performance requirements. We plug (84) into (83) in order to obtain the closed-loop error dynamics $$\dot{z}_k^v = f(v_k) - f(v_{k-1}) - \beta_k z_k^v - \nabla_{y_k} V_{k,k-1}(\Box y_k - y_{k-1}\Box_\sigma). \tag{85}$$

Under the assumption that the real function $f(\bullet)$ is concave and differentiable and its differential $f'(\bullet)$ is upper-bounded by a given constant $\gamma$, such that $f(v_k) - f(v_{k-1}) \le \gamma e_k^v$, it follows by Gronwall's lemma that the solutions of (85) are upper-bounded by those of the following completely decoupled closed-loop error dynamics $$\dot{z}_k^v = (\gamma - \beta_k) z_k^v - \nabla_{y_k} V_{k,k-1}(\Box z_k\Box_\sigma), \tag{86}$$

therefore rendering the velocity matching problem for the n platooning vehicles equivalent to the asymptotic stability of "0" as an equilibrium point for (86).

The following results delineate a decoupling property achieved by the closed-loop of this embodiment.

Assume the function $f(\bullet)$ in (81) satisfies the standard Lipshitz-like condition $(v_2 - v_1)^*(f(v_2) - f(v_1)) \le \alpha \Box v_2 - v_1 \Box_2^2$, for any two vectors $v_1$, $v_2$. The following Lyapunov function $$L = \frac{1}{2}\sum_{k=1}^{N} V_{k,k-1}(\Box y_k - y_{k-1}\Box_\sigma) + \frac{1}{2}\sum_{k=1}^{N} z_k^{v*} z_k^v \tag{87}$$

satisfies $$\frac{d}{dt}L = \sum_{k=1}^{N} z_k^{v*}(f(v_k) - f(v_{k-1})) - \sum_{k=1}^{N} \beta_k z_k^{v*} z_k^v \tag{88}$$

and therefore (88) does not depend on the Artificial Potential Functions included in the Lyapunov function (87).

To see this, taking the differential with respect to time in (87) yields $$\frac{d}{dt} V_{k,k-1}(\Box y_k - y_{k-1}\Box_\sigma) = \tag{89}$$

$$(\dot{y}_k - \dot{y}_{k-1})^*(\nabla_{y_k} V_{k,k-1}(\Box y_k - y_{k-1}\Box_\sigma) - \nabla_{y_{k-1}} V_{k,k-1}(\Box y_k - y_{k-1}\Box_\sigma))$$

and by employing the standard property of APFs:

$$\nabla_{y_k} V_{k,k-1}(\Box y_k - y_{k-1}\Box_\sigma) = -\nabla_{y_{k-1}} V_{k,k-1}(\Box y_k - y_{k-1}\Box_\sigma) \tag{90}$$

we get that $\frac{d}{dt} V_{k,k-1}(\Box y_k - y_{k-1}\Box_\sigma) =$ $$2\dot{z}_k^* \nabla_{y_k} V_{k,k-1}(\Box y_k - y_{k-1}\Box_\sigma)$$

therefore from (87) it follows that $$\frac{d}{dt}L = \sum_{k=1}^{N} z_k^{v*} \nabla_{y_k} V_{k,k-1}(\Box y_k - y_{k-1}\Box_\sigma) + \sum_{k=1}^{N} z_k^{v*} \dot{z}_k^v =$$

$$\sum_{k=1}^{N} z_k^{v*}(\nabla_{y_k} V_{k,k-1}(\Box y_k - y_{k-1}\Box_\sigma) + \dot{z}_k^v) \stackrel{(85)}{=}$$

$$\sum_{k=1}^{N} z_k^{v*}(f(v_k) - f(v_{k-1}) - \beta_k z_K^v) =$$

$$\sum_{k=1}^{N} z_k^{v*}(f(v_k) - f(v_{k-1})) - \sum_{k=1}^{N} \beta_k z_k^{v*} z_k^v$$

The velocity matching manifold is completely characterized by the leader dynamics i.e. $(y_0(t), v_0(t))$ accompanied by the zero error initial conditions $z_k^v(t) = 0$. Making use of (87) and (88) we conclude that the string tends to the minimum of the potential function $\Sigma_{k=1}^{N} V_{k,k-1}(\Box y_k - y_{k-1}\Box_\sigma)$. Since $V_{k,k-1}(\Box y_k - y_{k-1}\Box_\sigma) \to \infty$ as $\Box y_k - y_{k-1}\Box_\sigma \to 0$, the controller (84) avoids vehicles collision. Since in (88) the APFs are no longer present, the only parameter to design for performance purposes in the control law (84) are the gains $\beta_k$, with $1 \le \beta_k \le N$. Note that from (88) it follows that velocity matching is guaranteed as far as $\beta_k > \alpha$, $\forall k$ ($\alpha$ being the Lipshitz constant)

The Synchronization Mechanism for Delays Compensation

The embodiments described here may be used in conjunction with the synchronization mechanism in order to compensate the communications delays, therefore inducing fixed and point-wise delays. An accurate synchronization of the onboard measurements $z_k$ and $z_k^v$ with the predecessor's ($\theta$ ms. delayed) transmission $u_{k-1}$ in the control law in (84) yields $$u_k(t) = u_{k-1}(t-\theta) - \beta_k e_k^v(t-\theta) - \nabla_{y_k} V_{k,k-1}(\Box z_{k-1}(t-\theta)\Box_\sigma) \tag{91}$$

The closed-loop error dynamics (85) become $$\dot{z}_k^v(t) = f(z_k^v(t) + v_{k-1}(t)) - f(v_{k-1}(t)) - \beta_k z_k^v(t-\theta) - \nabla_{y_k} V_{k,k-1}$$
$$(\Box z_{k-1}(t-\theta)\Box_\sigma). \tag{92}$$

In order to evaluate the effects of the communications delays on the performance of the distribute control scheme the analysis can be performed by observing the fact that if all solutions of (92) converge to a bounded forward invariant set, then the velocity matching problem for all vehicles is achieved locally if the linearization of (92) is uniformly asymptotically stable. Therefore, the effect of communication delay on the string stability can be studied in two steps. Firstly we analyze the stability of velocity matching equilibria by linearizing (92) for the entire formation, around $(v^*, \ldots, v^*)$:

$$\begin{vmatrix} \dot{z}_1^v(t) \\ \vdots \\ \dot{z}_N^v(t) \end{vmatrix} = \Theta \begin{vmatrix} z_1^v(t) \\ \vdots \\ z_N^v(t) \end{vmatrix} - \begin{vmatrix} \beta_1 z_1^v(t-\theta) \\ \vdots \\ \beta_N z_N^v(t-\theta) \end{vmatrix} \quad (93)$$

where $\Theta = \frac{\partial f}{\partial v}(v^*)$.

As a second step, we can go beyond the linearized stability analysis by using the methods for "Synchronization of delay-coupled nonlinear oscillators: An approach based on the stability analysis of synchronized equilibria". The optimization of the $\beta_k$ controller gains may be performed in order to achieve supplemental performance under certain assumptions on the $f(\cdot)$ in (81), while accounting for closed-loop stability guaranties.

Embodiments of the present technology or any part(s) or function(s) thereof may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for operating a vehicle within a string of platooning vehicles, the method comprising:
   receiving, via a wireless communications link, a control signal of a predecessor vehicle, wherein the predecessor vehicle immediately precedes the vehicle in the string of platooning vehicles, and wherein the control signal is indicative of a level of at least one of a brake and a throttle applied in the predecessor vehicle;
   applying a first electronic filter to successive values of the received control signal, wherein the first electronic filter is based on a dynamical model of the vehicle;
   generating values of a distance measurement signal based on at least two measurements of the distance between the vehicle and the predecessor vehicle, each of the at least two measurements being taken at a different moment in time;
   wherein the distance measurement signal is defined such as to include a constant time headway h>0 that subtracts h multiplied with the speed of the vehicle at that moment in time from the distance between the vehicle and the predecessor vehicle at the same moment in time;
   applying a second electronic filter to successive values of the distance measurement signal, wherein the second electronic filter is based on the dynamical model of the vehicle; and
   generating a control action to be implemented by a brake and throttle actuating system of the vehicle to maintain a desired distance between the vehicle and the predecessor vehicle, the generating being based on the filtered control signal and on the filtered determined distance measurement signal.

2. The method of claim 1, characterized in that the first electronic filter is based on a dynamical model of the predecessor vehicle in a cascade connection with an inverse of the dynamical model of the vehicle.

3. The method of claim 1, characterized in that:
   the first electronic filter is based on a dynamical model of the predecessor vehicle in a cascade connection with an inverse of the dynamical model of the vehicle and further in a cascade connection with the inverse of the time headway filter; and
   the second electronic filter is in a cascade connection with the inverse of the time headway filter, wherein the time headway filter is:
   $H(s)=hs+1$ for continuous time systems and
   $H(z)=1+h(1-z^{-1})$ for discrete-time systems.

4. The method of claim 3, further characterized by:
   determining a communications induced time delay at the vehicle as a duration in time between completion of development of the control signal in the predecessor vehicle and when the control signal is received;
   wherein the communications induced time delay is determined based on a time stamping protocol for the control signal of the predecessor vehicle.

5. The method of claim 3, further characterized by:
   determining a communications induced time delay at the vehicle as a duration in time between completion of development of the control signal in the predecessor vehicle and when the control signal is received;
   wherein a delay in generating values of the distance measurement signal is set equal to the communications induced time delay at the vehicle.

6. The method of claim 3, further characterized by:
   determining a communications induced time delay at the vehicle as a duration in time between completion of development of the control signal in the predecessor vehicle and when the control signal is received;
   wherein the second electronic filter delays each distance measurement signal value by a delay amount prior to filtering it, wherein the delay amount is equal to a worst case scenario communications induced time delay minus a delay in generating values of the distance measurement signal; and
   wherein the first electronic filter delays each received control signal value by a delay amount prior to filtering it, wherein the delay amount for each respective value of the control signal is equal to the worst case scenario communications induced time delay minus the determined communications induced time delay for that respective value;
   whereby filtering by the first electronic filter and the second electronic filter is time synchronized for values respectively received thereat.

7. The method as in claim 3, characterized in that each successive value of the received control signal is time aligned to at least one of the successive values of the distance measurement signal so that operation of the first electronic filter and operation of the second electronic filter are synchronized when operating on, respectively, a value of the received control signal and a value of the distance measurement signal that are each generated within a time window.

8. The method of claim 3, further characterized by:
   determining a communications induced time delay at the vehicle as a duration in time between completion of development of the control signal in the predecessor vehicle and when the control signal is received;
   wherein the second electronic filter delays each distance measurement signal value by a delay amount prior to filtering it, wherein the delay amount is equal to a maximum of all latencies of all of the vehicles in the string minus a delay in generating values of the distance measurement signal minus a time delay of the vehicle's brake and throttling actuating system, wherein a latency for a vehicle is the sum of (i) the largest value of the time delay of the vehicle's brake and throttle actuating system and (ii) a worst case scenario communications induced time delay; and
   wherein the first electronic filter delays each received control signal value by a delay amount prior to filtering it, wherein the delay amount for each respective value of the control signal is equal to the maximum of all latencies of all of the vehicles in the string minus the determined communications induced time delay for each respective received control signal value minus the time delay of the vehicle's brake and throttling actuating system;

whereby the timing of operations of the first electronic filter and the second electronic filter on values supplied thereto are synchronized.

9. The method of claim 3, characterized in that a value of the received control signal is arranged to be time aligned to a value of the distance measurement signal and wherein the value of the received control signal that is time aligned is supplied to the first electronic filter at the same time that the time aligned value of the distance measurement signal is supplied to the second electronic filter.

10. The method of claim 3, characterized in that the second filter is further based on at least one of: a worst case scenario communications induced time delay and the maximum of all latencies of all vehicles in the string, wherein a latency of a vehicle is the sum of (i) the largest value of a time delay of the vehicle's brake and throttle actuating system, and (ii) a worst case scenario communications induced time delay.

11. The method of claim 3, characterized in that, when applying the first electronic filter to the received control signal, the first electronic filter receives a control signal value, wherein when applying the second electronic filter to the distance measurement signal the second electronic filter receives a distance measurement signal value, and wherein each control signal value received by the first electronic filter and each distance measurement signal value received by the second electronic signal are arranged so that they correspond in time within a prescribed time window;

whereby the first filter receives a value of the received control signal and the second filter receives a value of the distance measurement signal that correspond in time to each other.

12. A vehicle control system for operating a vehicle within a string of platooning vehicles, comprising:

a processing circuitry; and a memory, the vehicle control system being characterized by:

the memory containing instructions that, when executed by the processing circuitry, configure the vehicle control system to:

receive, via a wireless communications link, a control signal of a predecessor vehicle, wherein the predecessor vehicle immediately precedes the vehicle in the string of platooning vehicles, and wherein the control signal is indicative of a level of at least one of a brake and a throttle applied in the predecessor vehicle;

apply a first electronic filter to successive values of the received control signal, wherein the first electronic filter is based on a dynamical model of the vehicle;

generate values of a distance measurement signal based on at least two measurements of the distance between the vehicle and the predecessor vehicle, each of the at least two measurements being taken at a different moment in time;

apply a second electronic filter to successive values of the distance measurement signal, wherein the second electronic filter is based on the dynamical model of the vehicle and wherein the second filter is also based on the maximum of all latencies of all the vehicles in the string; and generate a control action to be implemented by a brake and throttle actuating system of the vehicle to maintain a desired distance between the vehicle and the predecessor vehicle, the generating being based on the filtered control signal and on the filtered determined distance measurement signal.

13. The system of claim 12, characterized in that the dynamical model for a referent vehicle, the referent vehicle being one the vehicle and the predecessor vehicle, includes at least one of: a mass of the referent vehicle, technical specifications of the referent vehicle's drive train, and technical specifications of the referent vehicle's brake and throttle actuating system.

14. The system of claim 13, characterized in that the dynamical model of a vehicle is determined from measurements of the vehicle's acceleration response to certain test control signals.

15. The system of claim 12, wherein the platooning vehicles are subject to road disturbances and wherein the first and second filters of each vehicle in the string are such that a closed-loop transfer function matrix from a vector of additive road disturbances to a vector of the signal of distance measurements is lower bi-diagonal.

16. The system of claim 12, wherein a leader vehicle within the string of platooning vehicles does not transmit its control signal to its follower vehicle.

17. The system of claim 12, wherein the platooning vehicles are subject to road disturbances and the second electronic filter for each of the platooning vehicles is based on extreme realizations of a filtered version of the additive road disturbances which is computed using disturbance invariant sets for discrete-time linear systems.

18. The system of claim 12, the instructions, when executed by the processing circuitry, further configure the vehicle control system to:

determine a communications induced time delay at the vehicle as a duration in time between completion of development of the control signal in the predecessor vehicle and when the control signal is received;

wherein the second electronic filter delays each distance measurement signal value by a delay amount prior to filtering it;

wherein the first electronic filter delays each received control signal value by a delay amount prior to filtering it wherein operation of the first electronic filter and operation of the second electronic filter are synchronized when operating on, respectively, a value of the received control signal and a value of the distance measurement signal that are each generated within a time window; and wherein the delay from the moment of completion of development of a value of the control signal in the predecessor vehicle to the moment the first electronic filter filters the received control signal value is equal for all vehicles in the string to a maximum of all latencies of all the vehicles in the string, wherein a latency for a vehicle is the sum of (i) the largest value of the time delay of the vehicle's brake and throttle actuating system and (ii) a worst case scenario communications induced time delay.

* * * * *